United States Patent [19]
Taira et al.

[11] Patent Number: 5,712,694
[45] Date of Patent: Jan. 27, 1998

[54] LCD COMPRISING A LIGHT SEPARATING ELEMENT INCLUDING A CHOLESTERIC LIQUID CRYSTAL SHEET

[75] Inventors: Kazuki Taira, Kawasaki; Yoshinori Higuchi, Yokohama, both of Japan

[73] Assignee: Kabushiki Kaisha Toshiba, Kawasaki, Japan

[21] Appl. No.: 528,114

[22] Filed: Sep. 14, 1995

[30] Foreign Application Priority Data

Sep. 16, 1994 [JP] Japan ..................... 6-222192

[51] Int. Cl.⁶ ............. G02F 1/1335; G02F 1/1333; G02F 1/13
[52] U.S. Cl. ................. 349/9; 349/62; 349/175
[58] Field of Search ............... 359/40, 41, 69, 359/49, 65, 101; 349/5, 9, 62, 175

[56] References Cited

U.S. PATENT DOCUMENTS

| | | | |
|---|---|---|---|
| 4,659,183 | 4/1987 | Suzawa | 359/49 |
| 4,909,604 | 3/1990 | Kobayashi et al. | 359/49 |
| 4,914,553 | 4/1990 | Hamada et al. | 359/49 |
| 4,998,804 | 3/1991 | Horiuchi | 359/49 |
| 5,042,921 | 8/1991 | Sato et al. | 359/49 |
| 5,153,752 | 10/1992 | Kurematsu et al. | 359/40 |
| 5,200,843 | 4/1993 | Karasawa et al. | 359/40 |
| 5,278,680 | 1/1994 | Karasawa et al. | 359/40 |
| 5,283,600 | 2/1994 | Imai | 359/40 |
| 5,325,218 | 6/1994 | Willet et al. | 359/65 |
| 5,485,291 | 1/1996 | Qiao et al. | 359/49 |
| 5,485,354 | 1/1996 | Ciupke et al. | 362/31 |

FOREIGN PATENT DOCUMENTS

| | | | |
|---|---|---|---|
| 0 597 261 A1 | 5/1994 | European Pat. Off. | 359/41 |
| 264613 | 3/1990 | Japan. | |
| 6160840 | 6/1994 | Japan. | |

OTHER PUBLICATIONS

Tai, et al: "A1.3: Flat Collimator: A Backlighting Assembly Utilizing Microprisms for High Energy Efficiency", SID 94 Applications Digest, pp. 10–13.

*Primary Examiner*—Williams L. Sikes
*Assistant Examiner*—Toan Ton
*Attorney, Agent, or Firm*—Cushman, Darby & Cushman IP Group of Pillsbury Madison & Sutro LLP

[57] ABSTRACT

A display device having an emitter, a direct-view display screen, a light-guiding member for guiding illumination light emitted from the emitter to the direct-view display screen, a light separating element for separating the illumination light selectively into a first and second polarized light component and transmitting the first light component and reflecting the second light component, a light converting member for converting the reflected second light component to a first light component, a reflecting plate for returning the converted first light component to the light separating element, and a half-wave film for rotating the vibration direction of the first polarized light component, thereby obtaining the illumination light.

9 Claims, 15 Drawing Sheets

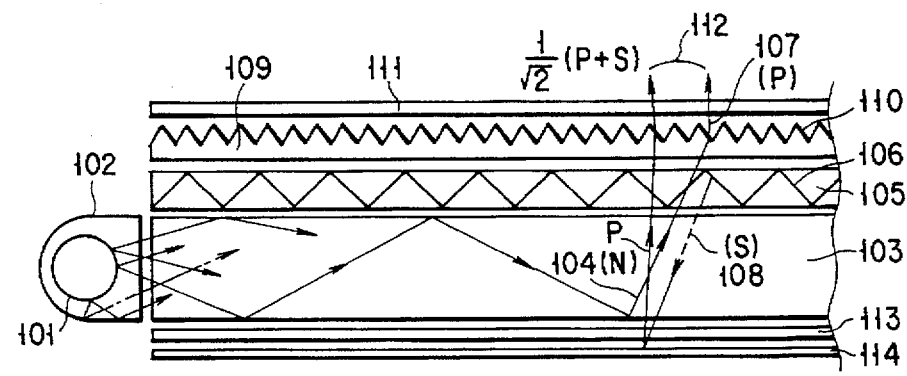
F I G. 2
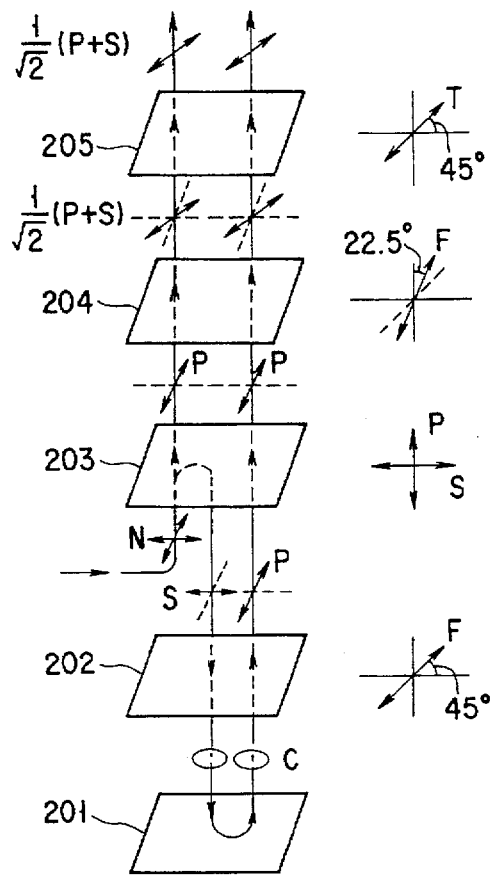
F I G. 3

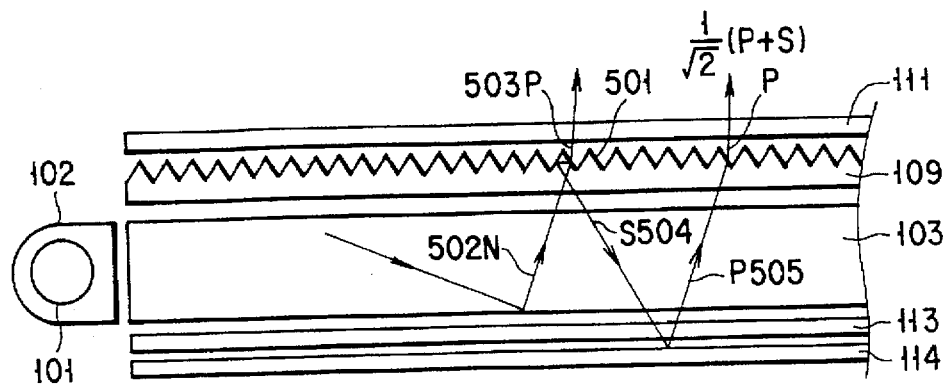
F I G. 6
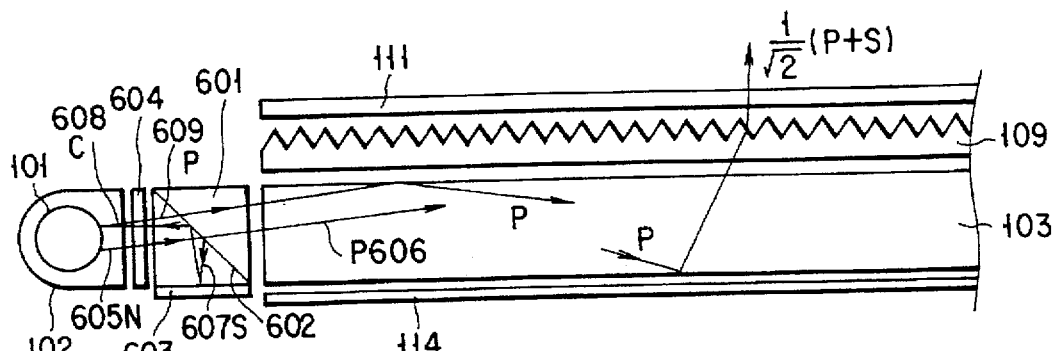
F I G. 7
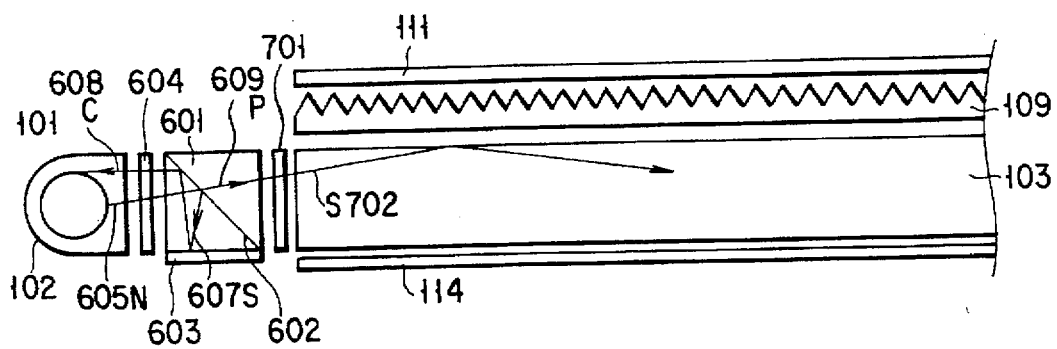
F I G. 8A
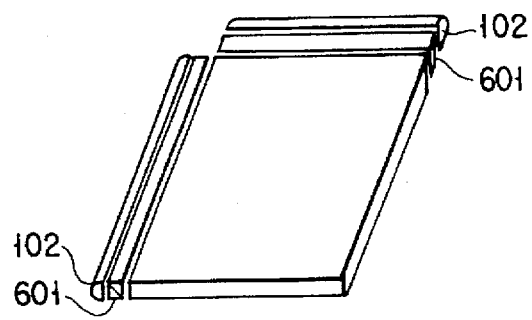
F I G. 8B

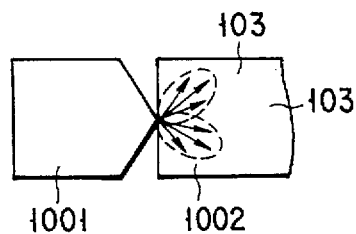
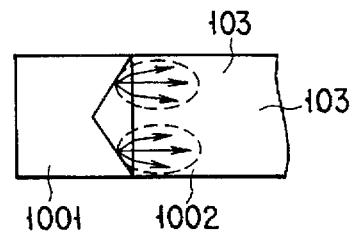
F I G. 12A  F I G. 12B
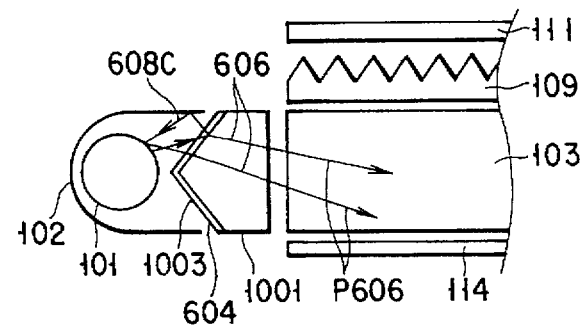
F I G. 13A
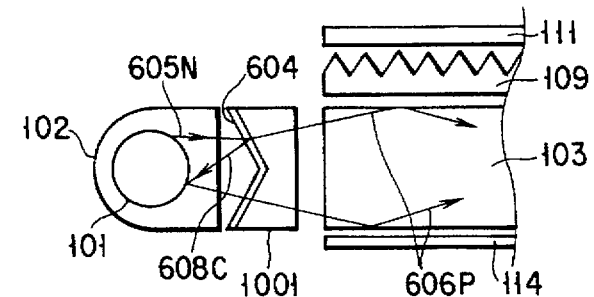
F I G. 13B
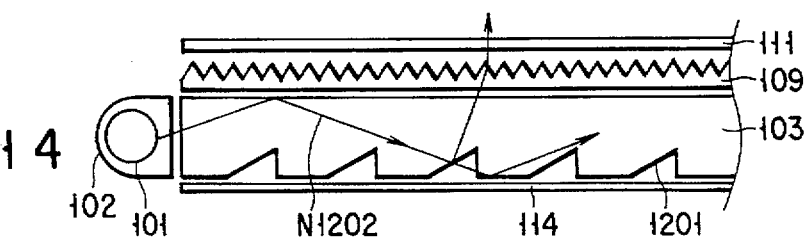
F I G. 14
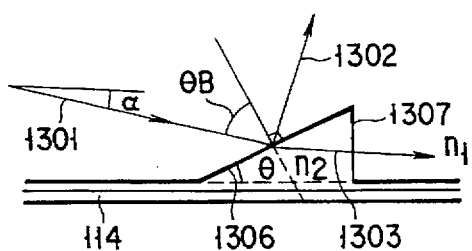
F I G. 15

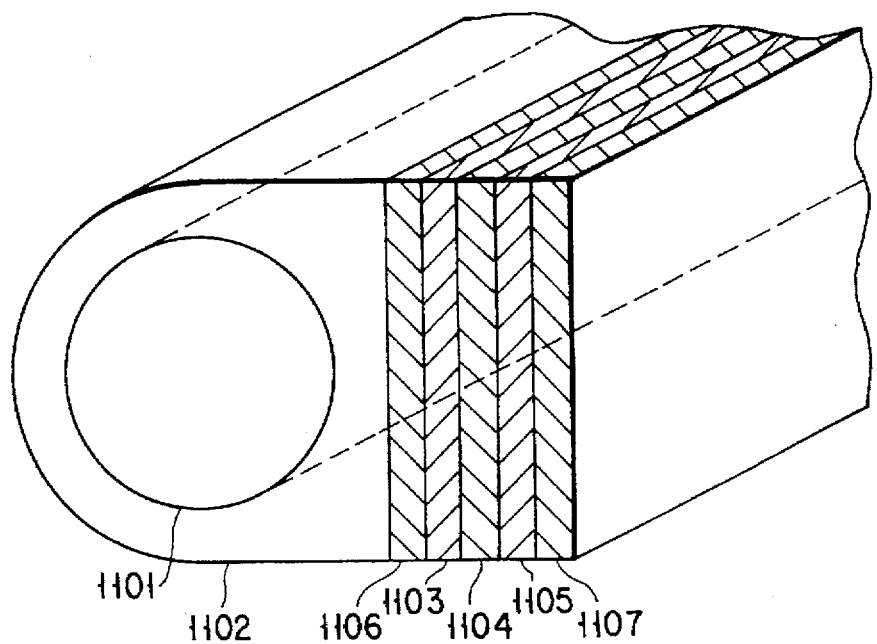
F I G. 16
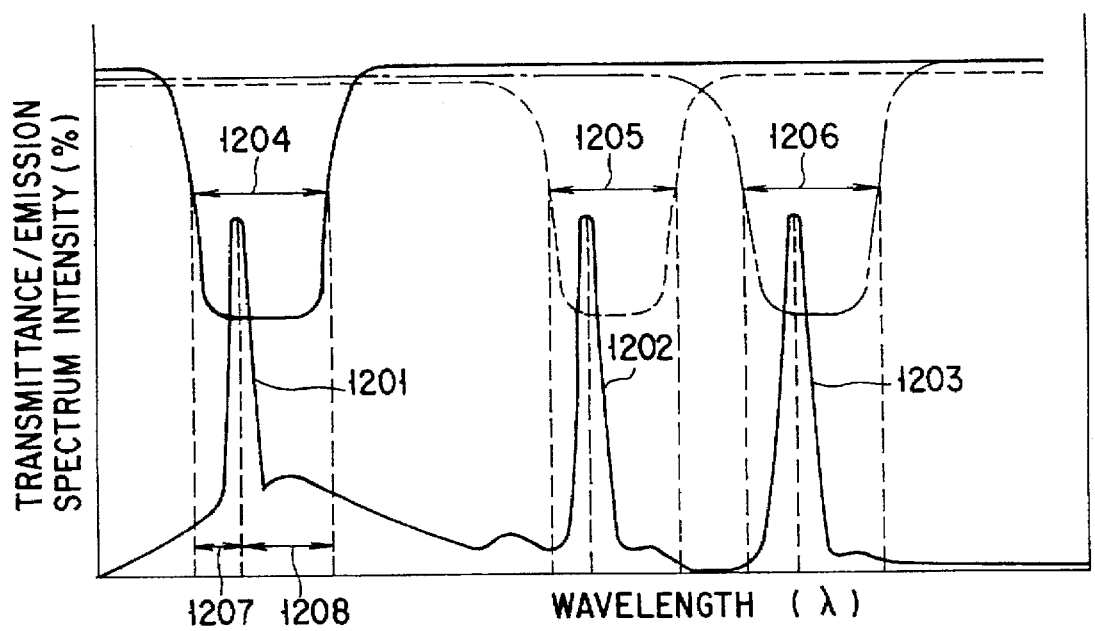
F I G. 17

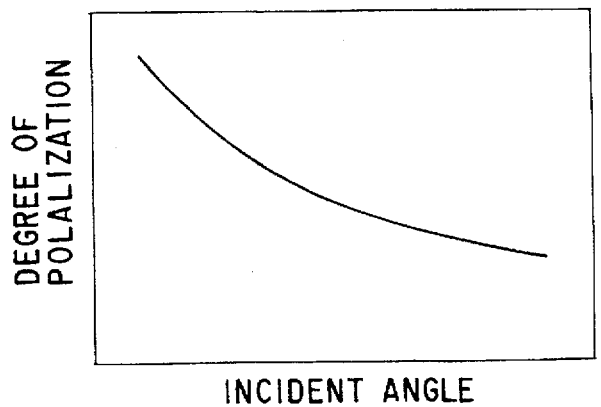
F I G. 27
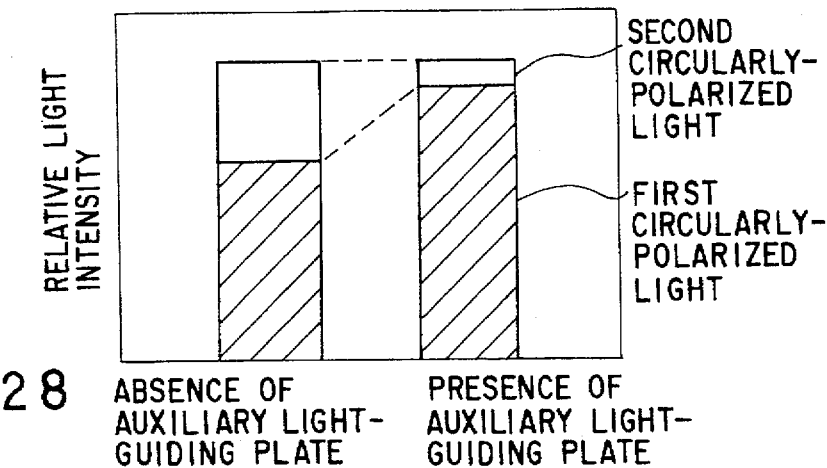
F I G. 28
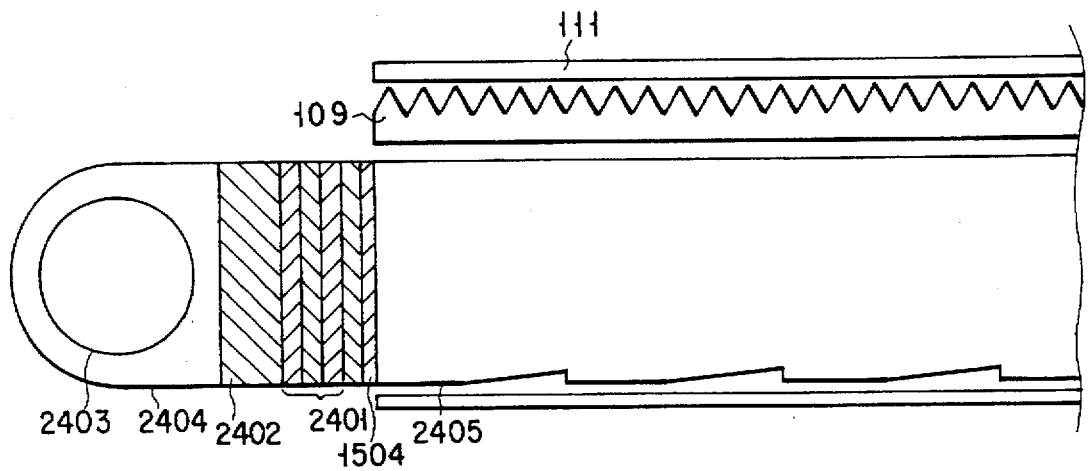
F I G. 29

LCD COMPRISING A LIGHT SEPARATING ELEMENT INCLUDING A CHOLESTERIC LIQUID CRYSTAL SHEET

BACKGROUND OF THE INVENTION

1. Field of the invention

The present invention relates to a flat-surface, direct-view display device, and more specifically to a liquid-crystal display device.

2. Description of the Related Art

Liquid crystal display devices are used in a wide variety of fields since they are thin and light and consume a small amount of electric power. A liquid crystal display most widely employed comprises two glass substrates, a liquid-crystal layer sandwiched between the two glass substrates, and polarizing plates provided on both outer sides of the glass substrates. In this display, the polarization state of incident light is controlled by electrically changing the orientation of the liquid crystal, thereby generating transmissive portions and non-transmissive portions in the liquid crystal. In this manner, some portions of the display screen appear bright, while the other portions appear dark.

Since the liquid-crystal display itself does not emit light, an illumination device must be positioned behind the liquid-crystal display panel and light applied to the panel from behind. By virtue of such a structure, the panel can display high-quality images at high luminescence.

In such an illumination device, as shown in FIG. 1, white light emitted from a fluorescent-tube emitter 101, such as a cold cathode tube, is made incident on a light-guiding plate 103 directly or after being reflected by a reflector 102. In the light-guiding plate 103, the light repeats total reflection without attenuation. However, when light is made incident on the white-printed (not shown) lower surface of the light-guiding plate 103, the light is reflected in a different direction due to the diffuse reflection effect. Consequently, the reflected light travels in the reverse direction from the light-guiding plate 103 to the illumination light source.

Above the light-guiding plate 103, there are provided a diffusion plate 201 and a prism sheet 109. The diffusion plate 201 is used for uniformly distributing illumination light over the display screen surface. The prism sheet 109 is used for controlling light so as to emit at a proper angle. In most cases, a white reflecting plate 114 is provided on the lower surface of the light-guiding plate 103. By providing the illumination device thus-constructed behind the liquid-crystal panel, it is possible to realize a display capable of displaying excellent images in brightness and in contrast.

The light emitted from the emitter used in a conventional illumination device is generally non-polarized light. Therefore, while the light is passing through the polarizing plate provided on the light incident side of the liquid-crystal panel, approximately half the amount of the incident light (i.e., incident light which vibration direction is not coincident with the transmitting axis of the polarizing plate) is absorbed. As a result, only half or less of the light emitted from the illumination device is utilized as an illumination light. The decrease in light utilization rate is a problem accompanied with the conventional luminescent devices. To provide a liquid crystal display having sufficiently high brightness, the amount of light emitted from a light source must be increased. In consequence, power consumption increases.

One of the methods for solving the aforementioned problem is disclosed in Jpn. Pat. Appln. KOKAI Publication No. 2-64613. In this method, light emitted from a light source is divided into two linearly-polarized light components crossed at right angles. One of the two light components is converted into a desired polarized light component and then made incident on a polarizing plate. However, such a conventional method principally requires a spatially broad space for converting the light component into a polarized light component. Hence, the method proposed in the prior art may be successfully applied to a projection-type liquid-crystal display device since it does not need to be manufactured in a flat form. However, if the method is applied to a direct-view liquid-crystal display, it is difficult to preserve the display's thin and light form.

SUMMARY OF THE INVENTION

The object of the present invention is to provide a display device having improved light utilization efficiency while preserving lightness and thinness which are characteristics of a direct-view display device.

According to the present invention, there is provided a display device comprising:

an emitter, a direct-view display screen, a light-guiding member for guiding the illumination light emitted from the emitter to the direct-view display screen, a light separating element for separating the illumination light selectively into a first and second polarized light components and transmitting the first light component and reflecting the second light component, a conversion/reflection member for converting the reflected second light component into the first light beam and returning it to the light separating element, and a light converting means for converting a vibration direction of the first light component transmitted through the light separating element into another vibration direction, thereby obtaining the illumination light.

According to the present invention, there is provided a display device comprising:

an emitter, a direct-view display screen, a light separating element including cholesteric liquid crystal sheets, for selectively separating the illumination light emitted from the emitter into a first and second polarized light components and transmitting the first polarized light component and reflecting the second light component, and a reflecting member for converting the reflected second light component into a first light component and returning it to the light separating element.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a view for explaining the structure of the display according to Embodiment 1 of the present invention;

FIG. 3 is an illustration for explaining the principle of Embodiment 1 of the present invention;

FIG. 6 is a view for explaining the structure of the display according to Embodiment 4 of the present invention;

FIG. 7 is a view for explaining the structure of the display according to Embodiment 5 of the present invention;

FIGS. 8A and 8B are views for explaining the structure of the display according to Embodiment 6 of the present invention;

FIGS. 12A and 12B are views for explaining the function of the display according to Embodiment 9 of the present invention;

FIGS. 13A and 13B are views for explaining the structure of the display according to Embodiment 10 of the present invention;

FIG. 14 is a view for explaining the structure of the display according to Embodiment 11 of the present invention;

FIG. 15 is a view for explaining the principle of the display according to Embodiment 11 of the present invention;

FIG. 16 is a prospective view for schematically explaining the structure of the illumination device according to Embodiment 12 of the present invention;

FIG. 17 is a diagram showing the relationship between a light source and the optical characteristics of the light separating element;

FIG. 27 is a graph showing the relationship between an incident angle to the light separating element and the light separating ability;

FIG. 28 is a graph showing the relationship between the presence or absence of the auxiliary light-guiding plate and the light separating ability;

FIG. 29 is a view schematically showing an example of the illumination device comprising an auxiliary light-guiding plate;

DETAILED DESCRIPTION OF THE PREFERRED EMBODIMENTS

Figure 1:
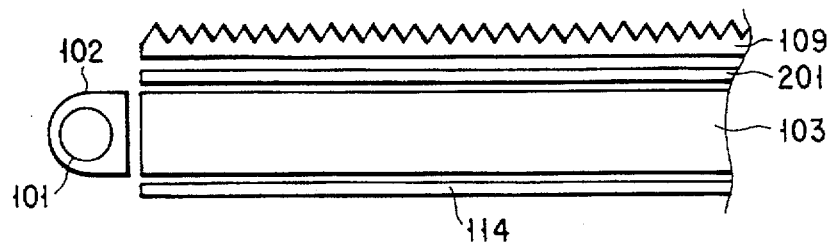
FIG. 1 is a view for explaining the structure of the conventional display.

The display device of the present invention comprises a display screen, an emitter consisting of a fluorescent tube, a light-guiding member for obtaining uniform luminescence, a reflecting plate for use in converting non-utilized light into usable illumination light, and a light separating element for separating a polarized light component by reflecting it on or transmitting it through a boundary face.

The light separating element may be a polarized beam splitter (PBS), which has an interference face formed by disposing a dielectric multi-layered film on the boundary face inclined to incident light. Alternatively, the light separating element may have a boundary face inclined to the incident light at the Brewster's angle. Further, the light separating element may be a cholesteric liquid crystal layer which causes interference in an illumination wavelength range.

More specifically, the light separating element includes the following elements:

A polarized light-beam splitter provided separately from a number of other members juxtaposed over an illumination area.

A prism sheet provided over the entire surface of an illumination area. The PBS function is given by coating a multi-layered film on a prism face of the prism sheet.

A PBS columnar member interposed between an emitter and a light guiding member.

A light-guiding controller for controlling an angle of the light emitted from an emitter and made incident on the light guiding member. The PBS function is given by coating a multi-layered film on the inclined surface of the light guiding controller.

A light guiding member from which light serving as an illumination light is emitted at approximately Brewster's angle.

A cholesteric liquid crystal sheet formed of laminated cholesteric liquid crystal layers each corresponding to each wavelength and having a selectivity of circularly polarized light due to interference in the illumination wavelength range.

Alternatively, a combination of any members mentioned above can be used as the light separating element.

The conversion/reflection member comprises a light converting element disposed on the display-side or the opposite side of the light-guiding member and reflecting plate disposed on the side opposite to the display-side of the light-guiding member.

Base materials for the light converting means include glass, plastics such as polycarbonate (PC), polymethyl-methacrylate (PMMA), styleneacrylonitrile, polystylene, methylmethacrylate, cyclohexylmethacrylate, allyldiglycolcarbonate, CR 39, and the like.

The light converting element may be a diffusion member, a retardation film, or the combination thereof. The diffusion member is provided on an entire illumination surface or on the emitter. Alternatively, the diffusion member is interposed between reflecting plates and light separating element provided both on the entire illumination surface and on the emitter.

As the retardation film, a half-wave film can be used in the case where the separated polarized light is a linearly polarized light, and incident light is transmitted once through it. On the other hand, a quarter-wave film can be used in the case where the separated polarized light is a linearly polarized light and transmission occurs twice including reflection. Further, a quarter-wave film can be used where the separated polarized light is a circularly polarized light and incident light is transmitted once through it.

In order to obtain maximum transmittance by making a vibration direction of polarized light emitted from an illumination device coincident with the transmitting axis of a polarizing plate placed on the incident side of the liquid-crystal panel, the following two methods may be used. First, the half-wave film is interposed between the incident-side polarizing plate and light emitting surface in such a manner that the fast axis thereof equally divides the angle formed between a vibration direction of emitting light and the transmitting axis of the polarizing plate. Second, the PBS sheet provided over the entire surface of the illumination area is disposed diagonally to a screen frame, thereby allowing the vibration direction of the polarized light directly emitted from the illumination device to be coincident with the transmitting axis of the polarizing plate. In these cases, the polarizing plate does not need to be placed on the incident-side of a liquid-crystal panel.

When the quarter-wave film is used as the light converting element in the case where transmission occurs twice including reflection, it is desirable that a linearly polarized light be converted into circularly polarized light by inclining its phase advancing axis at an angle of 45° to the vibration direction of incident polarized light. When the quarter-wave film is used as the light converting element in the case where transmission occurs once through it, its fast axis is at 45° with the vibration direction of an emitting linearly polarized light such that circularly polarized light is converted into linearly polarized light.

Of the optical members constituting the display of the present invention, the light-guiding member may be a flat transparent plate, parallel flat plate, or wedge-shaped plate. A white printed substrate or projections and depressions of a wedge or spherical shape may be provided on the lower surface of the light-guiding plate so as to distribute the illumination light uniformly. The reflecting member is preferably a glossy white reflecting plate or a mirror made of Al. When a mirror is used, its surface is roughened to cause diffused reflection or to reflect light in a specific direction only. The display may comprise a diffusing plate and a prism sheet for emitting the illumination light uniformly or for collecting it. These members are not indispensable for attaining the advantages of the present invention.

In the display of the present invention, the light emitted from the emitter is made incident onto the light guiding member, in which the light is repeatedly reflected or refracted, and emitted therefrom as the illumination light for a display screen. In this case, only the desired polarized light component is emitted due to the function of the light separating element. On the other hand, an undesired polarized light component is returned to the light-guiding member or the light source side without being absorbed by the light separating element. The returned polarized light component is converted into a non-polarized light component by the diffusion member or converted into a desired polarized light component by a retardation film. As a result, after conversion, the desired polarized light component is emitted again as illumination light. In this manner, the light component which has been absorbed by the polarizing plate placed on the incident side and, thus, unsuccessfully utilized in the prior art, can be efficiently used as illumination light.

Hereinafter, the present invention will be explained in detail with reference to embodiments. In the following embodiments, we will explain a back-lighted transmission-type liquid-crystal panel employing a polarizing plate as a liquid-crystal operation mode, such as $T_N$ (twisted nematic) mode or STN (super-twisted nematic) mode.

FIG. 2 is a sectional side view for explaining a structure of the display according to Embodiment 1 of the present invention. In the display shown in FIG. 2, there are provided a cold cathode fluorescent tube 101 as an emitter and a reflector 102 for reflecting light behind. The light emitted from the fluorescent tube 101 is made incident on a light-guiding plate 103 directly or after being reflected by the reflector 102. The incident light 104 is not-polarized light (indicated by a symbol "N" in the figure). The light 104 incident on the light-guiding plate 103 repeats total reflection and is emitted from the light-guiding plate 103 and finally made incident on a PBS sheet 105.

The PBS sheet 105 has a boundary face inclined at an angle of 45° with the sheet surface, on which an optical multi-layered film 106 is provided. A linearly-polarized light (indicated by a symbol "P") 107, defined by a polarized light component contained in an incident face, is transmitted through the multi-layered film 106 by interference effect with the film 106. The transmitted light is collected by the light-gathering function of a prism sheet 109. On the other hand, a polarized light component 108 (indicated by a symbol "S") emitted from the light-guiding plate 103 is perpendicularly crossed to the transmitting axis of the incident-side polarizing plate, is reflected by interference effect with the multi-layered film 106.

The prism sheet 109 has prism faces of groove-like form. The prism sheet 110 is desirably formed in such a manner that polarized light 107 incident into the prism sheet 105 is a P wave with respect to the prism face 110.

As shown in FIG. 2, in the case where the multi-layered film surface is parallel to a screen display surface, the vibration direction of the polarized light 107 emitted from the prism sheet 109 usually is not coincident with the transmitting axis of the polarizing plate (not shown) placed on the incident side of the liquid-crystal panel. This is because the transmitting axis of the polarizing plate is generally set at an angle of 45° with any side of the display area (shown in FIG. 5A) in order to ensure a viewing angle of the liquid-crystal panel. The light collected by transmitting through the prism sheet 109 is made incident on half-wave film 111 serving as a first polarized light converting element. The fast axis of the half-wave film 111 almost equally divides the angle formed between the vibration direction of the polarized light emitted from the prism sheet 109 and the transmitting axis of the incident-side polarizing plate. By the function of the half-wave film 111, the vibration direction of the polarized light is rotated in the direction of the fast axis from the vibration direction of the polarized light at the angle which is double the angle formed between the incident polarized light and the fast axis.

Based on this arrangement, the vibration of the polarized light emitted from the prism sheet 109 is coincident with the transmitting axis of the polarizing plate placed on the incident side of the liquid crystal. Therefore, the polarized light is efficiently utilized as illumination light 112 without substantially being adsorbed by the polarizing plate. However, when the transmitting axis of the polarizing plate is parallel to any side of the screen display surface, in other words, when the P wave emitted from the PBS sheet 105 coincides with the transmitting axis of the polarizing plate, it is apparent that the half-wave film 111 is not required.

On the other hand, the S wave 108 reflected by the surface of the multi-layered film 106 of the PBS sheet is further reflected twice by the surface of the multi-layered film 106. While being reflected, the S wave does not change its polarizing light component. Subsequently, the S wave 108 is incident again on the light-guiding plate without substantially losing its intensity. The light incident on the light-guiding plate either repeats total reflection or transmits through the light-guiding plate 103, depending on its angle formed between the incident light and the reflection surface of the light-guiding plate. The light totally reflected (not shown) gradually decreases in its polarization degree while the total reflection is repeated in the light-guiding plate 103. Finally, it is converted to non-polarized light identical to the light emitted from a fluorescent tube. The non-polarized light is passed through the PBS sheet 105, the prism sheet 109 and half-wave film 111 in the same manner as mentioned above. In this way, part of the non-polarized light beam is utilized as an effective illumination light 112.

The light transmitted through the light-guiding plate 103 is made incident on the quarter-wave film 113 serving as a second light converting element disposed in the under portion of the light-guiding plate 103. The quarter-wave film 113 is arranged in such a manner that the fast axis thereof is set at 45° to the vibration direction of the S wave 108 reflected by the PBS sheet 105. Based on this arrangement, linearly-polarized light incident on the quarter-wave film 113 is converted into circularly-polarized light. However, the circularly-polarized light is further reflected by the reflecting plate 114 tightly abutted on the lower portion of the quarter-wave film 113, and then transmitted through the quarter-wave film 113. Therefore, it is finally emitted from the film 113 as a light component perpendicularly crossed to the vibration direction of the incident polarized light. The vibration direction of the polarized light component finally obtained corresponds to the vibration direction of a P wave transmissible through the PBS sheet 105. Hence, the obtained light component is successfully made incident on the liquid-crystal panel as efficient illumination light 112.

As explained above, hitherto, the light component which is absorbed by the polarizing plate which is placed on the incident-side of the liquid-crystal panel has not been utilized as illumination light. However, the unutilized light in the prior art can be efficiently used as illumination light without being absorbed by the incident-side of the polarizing plate by virtue of the structure of the present invention. Hence, an illumination device improved in brightness and light utilization efficiency can be realized for use in a liquid-crystal panel.

In the aforementioned Embodiment 1, a central wavelength of half-wave and quarter-wave films serving as a light converting element can be set to a wavelength arbitrarily chosen from the range of visible-light wavelengths. The central wavelength is preferably set to a wavelength in the range of green-color emitting wavelengths providing a good spectral luminous efficiency. Furthermore, it is desirable that the half-wave film 111 be stuck tightly on the incident-side polarizing plate of the liquid-crystal panel and that the quarter-wave film 113 be adhered to a reflecting plate 114. A mirror, such as an Al-deposited surface having a high reflectivity, may be used as the reflecting plate 114. Alternatively, a glossy white plate is used for imparting diffusion of a certain degree.

To prevent generation of moire, the pitches of the PBS sheet and the prism sheet must be the same as the arranging intervals of picture elements of the liquid crystal panel. Alternatively, the pitch of the PBS sheet and the prism sheet may be set to significantly different conditions, for example, much narrower or wider pitch than the arranging intervals of picture elements. Furthermore, the pitch may be set at random. A space is preferred to be formed between the prism sheet and a liquid-crystal panel. On the other hand, for the purpose of distributing illumination uniformly and preventing the generation of moire, a single or a plurality of diffusing plates capable of imparting diffused transmission can be placed on the upper surface of the prism sheet 109. Alternatively, the diffusion plate(s) can be inserted between the prism sheet 109 and PBS sheet 105, between the prism sheet 105 and the light-guiding plate 103, or between the light-guiding plate 103 and the quarter-wave film 113. The diffusing plate may be inserted in a single place or a plurality of places mentioned above.

FIG. 3 shows the relationship between the optical arrangement of individual optical members employed in the display mentioned above and vibration direction of light components, and also shows individual functions of the optical members.

The light emitted from a light source that repeats total reflection inside light-guiding plate 103 is a non-polarized light beam (indicated by a symbol "N"). Therefore, it equally possesses both a P light component (indicated by a symbol "P") and an S light component (indicated by a symbol "S") which are perpendicularly crossed to each other. When the non-polarized light beam is made incident on the PBS film 203, the P wave is transmitted through the PBS film 203, conversely, the S wave is reflected by the PBS film 203. The transmitted P wave is subsequently transmitted through a half-wave film 204. At this time, the vibration direction of the P wave is at an angle of 22.5° with the fast axis of the half-wave film 204 (indicated by a symbol "F"). Hence, the P wave is rotated at an angle of 45° (indicated as $(1/\sqrt{2})(P+S)$) with the fast axis. The vibration direction of the P wave is coincident with the transmitting axis (indicated by a symbol "T") of a polarizing plate placed on the incident side of the liquid-crystal panel. Therefore, the P wave ms transmitted, without substantially being absorbed, and used as a luminescent light.

On the other hand, the S light beam reflected by the PBS sheet 203 is made incident on a quarter-wave film 202 disposed in the lower portion of the light-guiding plate 103. The vibration direction of the S wave is at an angle of 45° with the phase-advancing axis (indicated by a symbol "F") of the quarter-wave film 202. Therefore, the transmitted light is converted into a circularly-polarized light (indicated by a symbol "C"). The circularly-polarized light is reflected by the reflecting plate 201 and rotated in the reverse direction. Therefore, the circularly-polarized light is transmitted through the quarter-wave film 202. As a result, the vibration direction of the light transmitted through the film 202 is converted into the P direction. The resultant light becomes identical to a P wave capable of directly being made incident to the PBS sheet 203, so that the S polarized light beam which has been absorbed in the prior art can be efficiently utilized as an illumination light.

Figure 4:
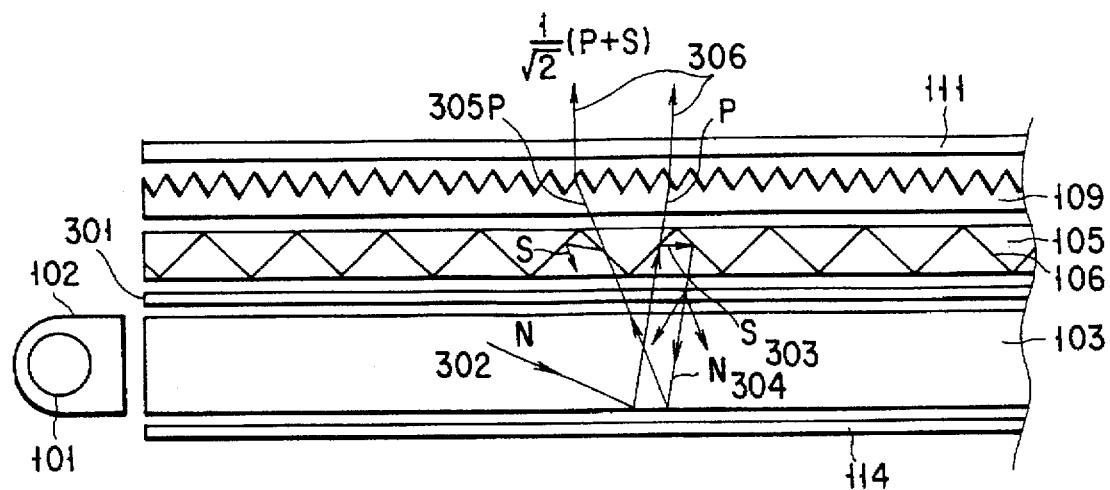
FIG. 4 is a view for explaining the structure of the display according to Embodiment 2 of the present invention.

FIG. 4 shows the structure of the display according to Embodiment 2 of the present invention. The structure is the same as that of Embodiment 1 except that a diffusion sheet 301 is interposed between the PBS sheet 105 and a light-guiding plate 103 instead of a quarter-wave film 202 serving as a second polarized light converting element provided on the upper portion of the reflection plate 201.

A non-polarized light 302 (indicated by a symbol "N") emitted from the light-guiding plate 103 is appropriately diffused so as to uniformly distribute illumination over the screen display surface and thereafter is made incident on the PBS sheet 105. Of the non-polarized light 302 thus diffused, the P wave transmitted through a multi-layered film 106 of the PBS sheet is collected by the prism sheet 109, rotated through half-wave film 111, and made incident on the liquid-crystal panel as efficient illumination light, in the same manner as in Embodiment 1.

On the other hand, the reflected S wave 303 is again made incident on the diffusion sheet 301. While being transmitted or slightly reflected by the diffusion sheet 301, the incident S wave is converted into a non-polarized light beam 304 (indicated by a symbol "N") due to diffusion. In other words, the S wave 303 reflected by the PBS sheet 106 is converted to the non-polarized light 304 consisting of the P wave component and S wave component. The non-polarized light 304 thus converted is reflected by a lower portion of the light-guiding plate 103 or the reflecting plate 114, and again made incident on the PBS sheet 106. Then, the P wave 305 of the incident light is selectively transmitted through the PBS sheet 106 and efficiently utilized as an illumination light 306. The display of Embodiment 2 may have same structure as in Embodiment 1 including conditions of a phase difference film, characteristics of the reflecting plate, pitches of the PBS sheet and prism sheet, the presence or absence of the diffusion plate, and the like.

Figure 5A:
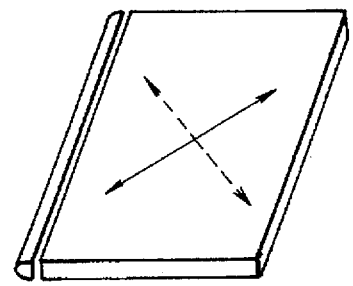
FIGS. 5A to 5C are illustrations for explaining the transmitting axis of the polarizing plate and Embodiments 1, 2 and 3.
Figure 5B:
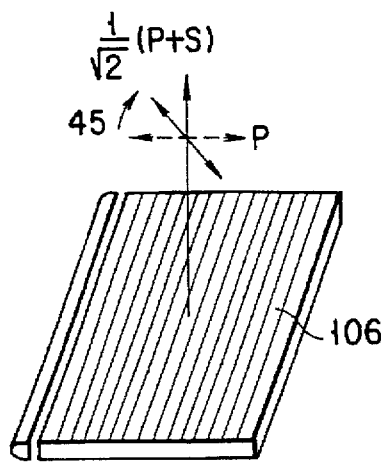
Figure 5C:
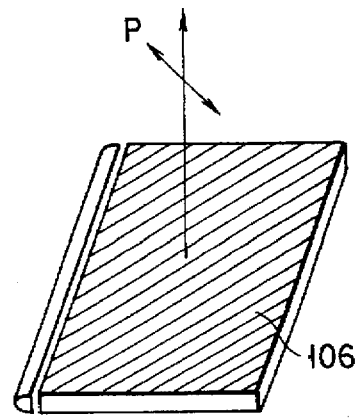

FIGS. 5A to 5C are illustrations for explaining the structure of the display devices according to Embodiment 3 of the present invention. As described in Embodiment 1, the transmitting axis of the polarizing plate of the liquid-crystal panel is arranged at 45° with any side of the display area of liquid crystal for ensuring a viewing angle as shown in FIG. 5A. In FIG. 5A, the transmission axes of the polarizing plates placed on the incident side and on the outgoing side are indicated by a dotted line and a solid line, respectively. Therefore, in Embodiments 1 and 2, in the case where the extending direction of multi-layered film face of the PBS sheet 106 is parallel to the side of the screen display surface, the transmitted P polarized light is rotated by the half-wave film so as to be coincident with the transmitting axis of the incident-side polarizing plate.

In contrast, in Embodiment 3, as shown in FIG. 5C, the extending direction of multi-layered film face of PBS sheet 106 is arranged at 45° with the side of the screen display surface. Owing to the structure mentioned above, the vibration direction of the P wave transmitted through the PBS sheet is coincident with the transmitting axis of the polarizing plate without being converted by the half-wave film. Thus, in this embodiment, the half-wave film used in Embodiments 1 and 2 can be eliminated, enabling cost saving. Furthermore, deterioration scarcely occurs in white balance which is generated due to wavelength diffusion by the light conversion element. In addition, the multi-layered film extending direction of the PBS sheet is at an angle of 45° with the arranging direction of picture elements. Therefore, moire generated by the interference between two periodical structural arrangements results in a non-visible high-frequency light component. In consequence, deterioration of display images will be inhibited.

FIG. 6 is a view for explaining the structure of the display according to Embodiment 4 of the present invention. In this Embodiment 4, a multi-layered reflection film is provided to the prism border face 501 of the prism sheet 109 whereby the prism sheet 109 functions as a light separating element in the similar manner to the PBS sheet in Embodiments 1 and 2, in addition to its inherent light collection function.

The non-polarized light 502 emitted from the light-guiding plate is made incident on the prism sheet 109. The P wave 503 is transmitted through the prism sheet 109 due to the interference by the multi-layered film, while undesired S wave 504 is reflected. The transmitted P wave 503 is emitted as an illumination light in the most preferable direction owing to the light collecting function of the prism. Furthermore, the vibration direction of the P wave 503 is converted into the desired direction by the half-wave film 111. On the other hand, the reflected S wave 504 is reflected twice on the multi-layered film surface and again made incident on the light-guiding plate 103. Thereafter, it is converted to polarized P wave 505 via a quarter-wave film 113 and a reflecting plate 114, transmitted through the prism sheet 109 and used as an illumination light in the same manner as in Embodiment 1.

According to Embodiment 4, a thin display device can be realized by imparting the light separating function to the prism sheet without increasing the number of members and the thickness thereof. In the case where Embodiment 4 is combined with Embodiment 2, the quarter wavelength film 113 can be eliminated, while the diffusing plate 301 can be added.

FIG. 7 is a view for explaining the structure of the display according to Embodiment 5 of the present invention. In Embodiment 5, a PBS columnar member 601 is disposed in an optical path from a fluorescence tube 101 to the light-guiding plate 103. In the lower surface of the PBS columnar member 601, an Al-deposited reflection mirror 603 is formed. On the incident side, namely, fluorescent tube side of the PBS columnar member 601, a quarter-wave film 604 is disposed. The illumination area of the crystal liquid panel comprises the reflecting plate 114, light-guiding plate 103, prism sheet 109 and half-wave film 111, in consecutive order from the bottom.

A non-polarized light beam 605 emitted from the fluorescent tube 101 is transmitted through the quarter-wave film 604. Due to non-polarized light, light 605 is not subjected to polarization conversion action during the transmission. Of the light 605 made incident on the PBS columnar member 601, a P wave 606 is transmitted through the interference face 602 of a multi-layered film and made incident on the light-guiding plate 103, while an S wave 607 is totally reflected by the interference face of the multi-layered film 602. The transmitted P wave 606 is reflected by the light-guiding plate 103, collected by the prism sheet 109, polarization rotated by the half-wave film 111 and used as an illumination light. Since the reflection occurring inside these members and between members is substantially mirror reflection, the P polarized light preserves its polarization degree and is effectively used as a polarized light.

On the other hand, the reflected S wave 607 is reflected by the mirror 603, further reflected by the interference face of the multi-layered film 602 and emitted in the direction of the fluorescent tube. While the S wave is passed through the quarter-wave film 604, the linearly-polarized light component of the S wave is converted into a circularly-polarized light component. The circularly-polarized S wave is then reflected by the inner surface of the fluorescent tube 101 and the reflector 102, transmitted through the quarter-wave film 604 again, and finally converted into P wave 609. Thereafter, the converted P wave 609 is transmitted through PBS 601 and made incident on the light-guiding plate 103, and finally used as illumination light in the same manner as the P wave 606 initially made incident on the light-guiding plate. From the foregoing, it is clear that the structure of Embodiment 5 makes it possible to improve light-utilization efficiency.

Embodiment 5 can be used in combination with Embodiments 1 to 4. In this case, members must be disposed in such a manner that the polarized light component emitted from the PBS columnar member 601 corresponds to the light component transmitted through the PBS sheet or the prism sheet having the light separating function.

FIG. 8A is a view showing a structure of the display device according to Embodiment 6 of the present invention. The structure of Embodiment 6 is characterized by comprising a half-wave film 701 interposed between the PBS columnar member 601 and the light-guiding plate 103 in addition to the structure of Embodiment 5 shown in FIG. 7. The P wave 609 emitted from the PBS columnar member 601, when it is made incident on the light-guiding plate 103, is converted to an S wave 702 by the half-wave film 701 whose fast axis is at an angle of 45° with the vibration direction of the P wave 609. In the case where the fast axis is set in the direction at an angle of θ (not shown) with the vibration direction of the P wave 609, the linearly-polarized light containing the P wave and S wave can be obtained in the direction at an angle of 2 θ. Interposing quarter-wave film, rather than half-wave film results in elliptically-polarized light or circularly-polarized light.

As explained in the foregoing, by interposing the half-wave film or quarter-wave film serving as a light beam converting element between the PBS columnar member 601 and the light-guiding plate 103, a predetermined polarized light can be made incident on the light-guiding plate. In this manner, the polarization state of the light incident on the prism sheet 109 can be freely designed or optimized.

As shown in FIG. 8B, in the case where fluorescent tubes are respectively provided on the longer side and shorter side of the display surface, or in the case where an L-shape fluorescent tube is used, the polarizing directions of the lights incident on the light-guiding plate must be perpendicularly crossed to each other. Therefore, Embodiment 6 in which the light emitted from the PBS columnar member 601 can be polarized must be provided on one side and Embodiments 6 or 5 shown in FIG. 7 must be applied to the other side.

Figure 9:
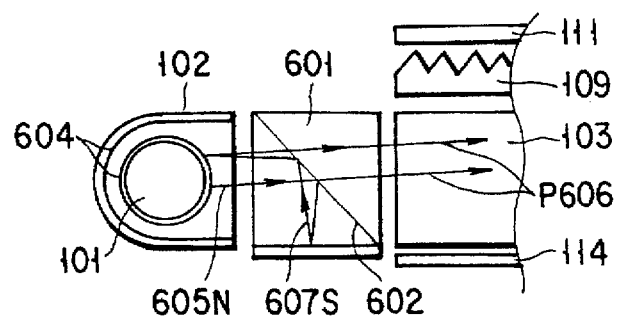
FIG. 9 is a view for explaining the structure of the display according to Embodiment 7 of the present invention.

FIG. 9 is a view showing a structure of the display device according to Embodiment 7 of the present invention. This Embodiment 7 has the same characteristics as those of Embodiment 5 shown in FIG. 7 except that the quarter-wave film 604 is disposed to the surfaces of the fluorescent tube 101 and reflector 102 instead of being interposed between the PBS 601 and the reflector 102. By virtue of the aforementioned structure, the same advantages as mentioned in Embodiment 5 can be obtained. Besides this, since the quarter-wave film 604 is tightly abutted on the reflecting surface, incident light and the reflected light thereof are passed through the same area of the quarter-wave film 604. Hence, it is possible to improve polarization conversion efficiency by optimizing the characteristics of the quarter-wave film 604 at each site.

Figure 10:
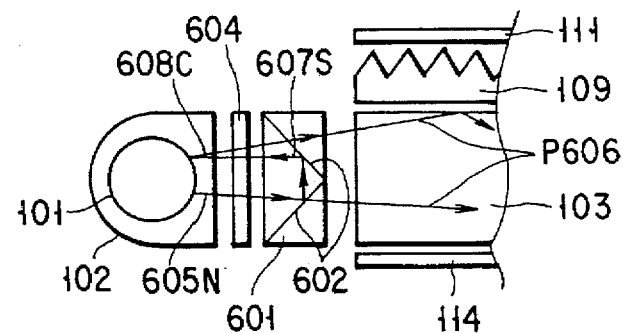
FIG. 10 is a view for explaining the structure of the display according to Embodiment 8 of the present invention.

FIG. 10 is a view of the display of Embodiment 8 of the present invention. In this embodiment, compared to Embodiment 5 shown in FIG. 7, two interference surfaces 602 formed of the multi-layered film are provided on the PBS sheet 601 as shown in FIG. 10. By this structure, the reflection times of the S wave 607 which is reflected and made incident again on the fluorescent-tube side, can be reduced by one, compared to that of Embodiment 5. Thus, a loss in the light intensity at the time of reflection can be reduced.

Figure 11A:
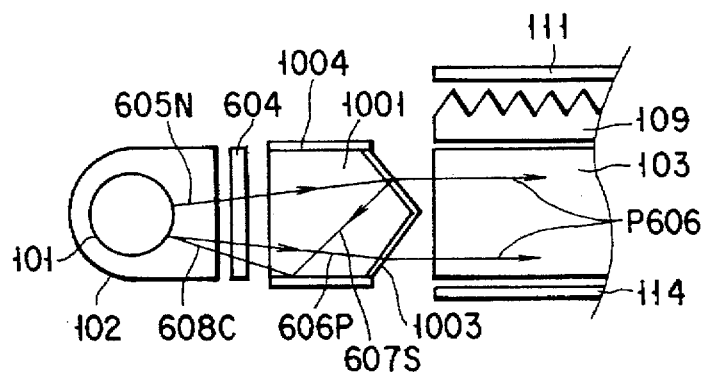
FIGS. 11A and 11B are views for explaining the structure of the display according to Embodiment 9 of the present invention.
Figure 11B:
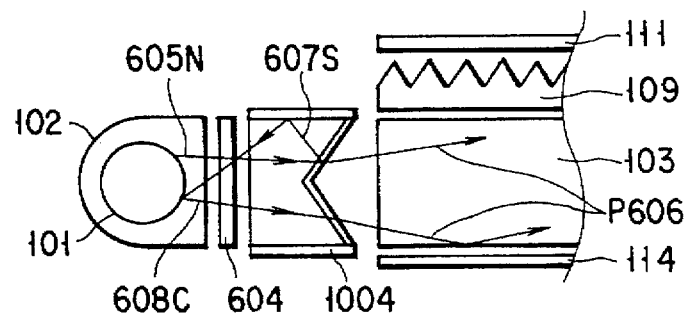

FIGS. 11A and 11B are views showing structure of the display device according to Embodiment 9 of the present invention. In this embodiment, in an optical path from the fluorescent tube 101 to the light-guiding plate 103, a light-guiding control member 1001 is disposed which properly controls the distribution of incident angles of the incident light on the light-guiding plate 103. The light-guiding controller 1001 comprises an interference face formed of a multi-layered film capable of separating a polarized light beam, which is disposed on the light emitting surface 1003. The light-guiding controller 1001 further comprises mirrors 1004 which are disposed on the upper and lower portions thereof.

FIG. 11A is an embodiment using a projection-type light-guiding controller. FIG. 11B is an embodiment employing a depressed-type light-guiding controller. The light-guiding controller 1001 is capable of properly controlling an incident angle distribution 1002 so as to generate total reflection when the light emitted from the light source is made incident on the light-guiding plate 103, as shown in FIGS. 12A and 12B. The incident angle distribution is determined based on the refraction index of the light-guiding controller 1001 and the angle of the light emitting surface 1003.

In Embodiment 9, by providing the interference face formed of the multi-layered film to the light emitting surface 1003, the reflected wave 607 is reflected by the reflection mirror 1004, transmitted through the quarter-wave film 604 twice in the similar fashion to Embodiment 5, converted into the P wave 606, and then made incident on the light-guiding plate. The interference face of the multi-layered film herein does not contribute to the primary function of the light-guiding controller, that is, the function of controlling the direction of the emitting light. Therefore, a single light-guiding controller can possess the light-guiding control function together with the light separating function.

As mentioned above, by virtue of the structure of Embodiment 9 of the present invention, the display device can possess the light-guiding controlling function and light converting function without increasing the size of individual members and the entire device, compared to the conventional structure. Furthermore, in the Embodiment 9, even if the quarter-wave film 604 is interposed between the reflecting faces 1004 instead of the interposed position shown in FIGS. 11A and 11B, the same advantages can be obtained. In this case, the light emitted from the interference face of multi-layered film 1003 is made diagonally incident on the reflecting face 1004 so that it is necessary to optimize the retardation such that quarter-wave film functions with respect to a diagonally incident light beam.

FIGS. 13A and 13B are views for explaining the structure of the display according to Embodiment 10 of the present invention. This embodiment is characterized in that the light-guiding controller 1001 has the light separating function by providing an inclined incident face on the light incident side to control an incident angle to the light-guiding plate. In this embodiment, on the inclined incident face 1003, the quarter-wave film 604, a protecting layer, and a multi-layered interference screen are formed in successive order from the light source side.

In this embodiment having the aforementioned structure, although its function and advantages are the same as in Embodiment 9, the reflected S wave can be efficiently converted to circularly-polarized light since the multi-layered film interference screen having the light separating function and the quarter-wave film having the polarized light converting function are almost in contact to each other. Furthermore, a loss in light intensity at the time of reflection can be suppressed since the reflection distances among quarter-wave film 604, fluorescent tube 101 and reflector 102 can be shortened.

The aforementioned Embodiments 6 to 10 can be used in combination with Embodiments 1 to 4 in the same manner as in Embodiment 5.

FIG. 14 is a view for explaining the display according to Embodiment 11 of the present invention. This embodiment is characterized in that a depressed portion 1201 having a saw-toothed sectional view is disposed in the lower portion of the light-guiding plate 103. In this embodiment, a separation of a light is principally based on refraction and reflection occurring on the boarder face at the Brewster's angle represented by $\theta_B = \tan^{-1}(n_2/n_1)$ wherein $n_1$ is a refractive index of light on the incident-side medium and $n_2$ is a refractive index of light on the emitting-side medium.

Since the light 1202 emitted from the fluorescent tube 101 is non-polarized light, the light 1202 repeats total reflection after it is made incident on the light-guiding plate 103. When the light 1202 is made incident on the depressed portion 1201 provided on the lower portion of the light-guiding plate 1202, the incident angle does not fall within the range in which total reflection is performed. Therefore, the light 1202 is emitted from the light-guiding plate 103 to the prism sheet 109, and controlled to be an adequate emission angle by the prism sheet 109, transmitted through the half-wave film 111, and then converted to illumination light. In this case, by properly controlling the relationship between an inclined angle of the depressed portion and an incident angle of light, a separation of the polarized light beam is performed. Hereinafter, this portion will be explained in detail.

FIG. 15 is an enlarged view of the light-guiding plate 103 and the depressed portion 1201 provided on the lower surface thereof shown in FIG. 14. First, we will describe the case where non-polarized light 1301 is made incident on the bottom surface of the light-guiding plate at an angle of $\alpha$. At this time, the incident angle of the non-polarized light beam 1301 to the light-reflecting boundary face 1306 is assumed as $\theta_B$, approximately 15% of the S wave is reflected, but almost all of the P wave can be transmitted. The incident angle of the reflected S wave 1302 to the upper boundary face of the light-guiding plate 103 is outside the range in which total reflection can be performed. Therefore, the S wave is emitted from the light-guiding plate and used as polarized illumination light.

On the other hand, light 1303 consisting of about 85% of S wave and entire P wave transmitted through the light-reflecting boundary face 1306 once goes out of the light-guiding plate, and is again made incident on the boundary face 1307 directly or after being reflected by the reflection plate. Thereafter, the polarized light 1303 is selectively reflected on the light-reflecting boundary face of the neighboring depressed portion, or repeats total reflection on the bottom or the upper surface of the light-guiding plate. When total reflection is performed, P wave is appropriately converted into an S wave by repeating reflection diagonally to the polarizing direction. On the other hand, in the cases where the polarized light is not fully converted by reflection, the vibration direction of the polarized light may be rotated by providing a $\lambda/2$ half-wave film on the boundary face 1307. Alternatively, the polarized light may be converted to a non-polarized light by using a poor diffusion surface. As mentioned above, it is possible to efficiently obtain illumination light having a high degree of polarization by providing the depressed portions at a suitable angle on the bottom of the light-guiding plate.

When polymethylmethacrylate (PMMA) having the refraction index of about 1.5 is employed as a light conductive material, if the refraction index of the air on the light emitting side is regarded as 1.0, the incident angle $\alpha$ of the light 1301 repeating total reflection falls within the range $0° < \alpha < 48.2°$. In order for part of the light falling within the range is crossed to the boundary face 1306 at the Brewster's angle $\theta_B$, angle $\theta$ formed between the boundary face 1306 of the depressed portion and a flat lower surface of the light-guiding plate may be set to an angle in the range of $3° < \theta < 56.3°$ preferably in the range of $26.3° < \theta < 36.3°$.

When polycarbonate (PC) having a refraction index of about 1.6 is selected as a light-guiding material, angle $\theta$ may preferably fall within the range of $16.0° < \theta < 58.0°$, more preferably in the range of $28.0° < \theta < 38.0°$, taking the condition of $0° < \alpha < 51.3°$ into consideration. If the depressed portion including the light-emitting surface is selected within the angle range mentioned above to optimize the depth of the depressed portion, illumination light providing luminescence uniformly over the entire illumination area can be obtained with the degree of polarization.

The Embodiment 11 can be used in combination with any one of Embodiments 1 to 4 or any one of Embodiments 5 to 10. Alternatively, Embodiment 11 can be used in combination with any one of Embodiments 1 to 4 and any one of Embodiments 5 to 10.

As explained in the foregoing, according to Embodiments 1 to 11, a desired polarized light component of the light emitted from an emitter can be emitted as an illumination light. An undesired polarized light component thereof is returned to the light-guiding member side without being absorbed by a light separating element and then non-polarized, or converted into a desired polarized light component and then made incident again on the light separating element. Therefore, the light absorbed by a polarizing plate of the incident side of the liquid crystal and not utilized as an illumination light in the prior art can be efficiently utilized. Owing to this, a flat-type liquid-crystal display using a polarized light can be realized with a light utilization efficiency higher than that of a conventional display.

FIG. 16 is a perspective illustration schematically showing the structure of the illumination device according to Embodiment 12 of the present invention.

In the illumination device, a cold cathode fluorescent tube 1101 is used as a light source. The cold cathode fluorescent tube 1101 is of a three-band type containing emission spectra at a wavelength from 420 to 450 nm, a wavelength from 520 to 570 nm, and wavelength from 590 to 630 nm, which corresponds to blue, green and red, respectively. Around the cold-cathode fluorescent tube 1101, a reflector 1102 having a U-shape cross section is disposed for reflecting light in a predetermined direction. In the opening side of the reflector 1102, a light separating element is disposed which transmits a first polarized light component, but reflects a second light component. The light separating element comprises three-layered cholesteric liquid-crystal sheet interposed between glass substrates 1106 and 1107. The three-layered cholesteric liquid-crystal sheet is formed by laminating cholesteric liquid-crystal sheets 1103, 1104, and 1105 having an interference wavelength area which corresponds to that of a main emission spectrum of the light source.

The light separating element may have a structure in which a glass layer is disposed between each of cholesteric liquid-crystal layers. Alternatively, it may have a structure in which units are separately prepared each of which consists of a cholesteric liquid crystal layer interposed between glass substrates, and each unit is stuck together. In this case, a refractive index has to be matched between glass layers. The thickness of the glass layer is preferred to be 1 mm or less.

These cholesteric liquid-crystal sheets 1103, 1104, and 1105 are disposed in such a manner that circularly-polarized light having an identical polarity can be transmitted or reflected. The number of the cholesteric liquid-crystal sheets can be varied depending on the number of main emission spectra of the light source and a wavelength range.

The cholesteric liquid-crystal sheet can transmit 50% of a non-polarized light beam (first circularly-polarized light component) and reflect 50% thereof (second circularly polarized light component) in a respective interference wavelength area. Therefore, there is no substantial loss of light. Outside the interference wavelength range, 100% of light is transmitted. If non-polarized white light is made incident on the light separating element comprising the cholesteric liquid-crystal sheets having the aforementioned characteristics, it can be efficiently separated into two circularly-polarized light components.

In the illumination device shown in FIG. 16, the surface of the cold-cathode fluorescent tube 1101, the reflector 1102 and the glass substrate 1106 function as a light-guiding member or a light converting element.

The light emitted from the cold cathode fluorescent tube 1101 is made incident on the cholesteric liquid-crystal sheets 1103, 1104 and 1105 serving as a light separating element, directly or after being reflected by the reflector 1102. The light emitted from the light source and made incident on the light separating element is separated into a first circularly-polarized light component and a second circularly-polarized light component. The first circularly-polarized light component is transmitted through the light separating element and emitted in the opposite direction of the light source. In contrast, the second circularly-polarized light component is emitted on the light source side. The second circularly-polarized light component is reflected by the surface of a cold cathode fluorescent tube 1101, the reflector 1102 and the glass substrate 1106 and then made incident on the light separating element. Since the polarity of the circularly-polarized light component is converted through reflection, the second circularly-polarized light component is converted into a first circularly-polarized light component. In some cases, the first circularly-polarized light component is converted into the second circularly-polarized light component. However, in this case, the second circularly-polarized light component cannot transmit through the light separating element, but is reflected. Therefore, according to the illumination device of this embodiment the light emitted from the cold-cathode fluorescent tube 1101 can be emitted from the glass substrate 1107 as the first circularly-polarized light component with no substantial loss.

FIG. 17 shows the relationship between a light source and the optical characteristics of the cholesteric liquid-crystal sheets when cholesteric liquid-crystal sheets are used as a light separating element.

In FIG. 17, a three-band fluorescent tube having three main emission spectra is used as a light-source. Three emission spectra are a blue-emitting (B) spectrum 1201 having a main wavelength at 440 nm, a green-emitting (G) spectrum 1202 having a main wavelength at 550 nm, and a red-emitting (R) spectrum 1203 having a main wavelength at 610 nm. A half width of each spectrum is approximately 10 nm.

Characteristics in transmissivity of a cholesteric liquid-crystal sheet with respect to non-polarized incident light is that interference wavelength areas are present in blue 1204, in green 1205 and in red 1206, which corresponds to the emission spectrum B, G, or R, respectively. These interference wavelength areas are designed to include the respective peaks of the aforementioned respective main emission spectra of the light source. Alternatively, as will be described later, the relative relationship between the interference wavelength area and the main emission spectrum may be defined in such a way that a peak of the main emission spectrum is present on the shorter wavelength side with respect to the center of the interference wavelength area.

Figure 18A:
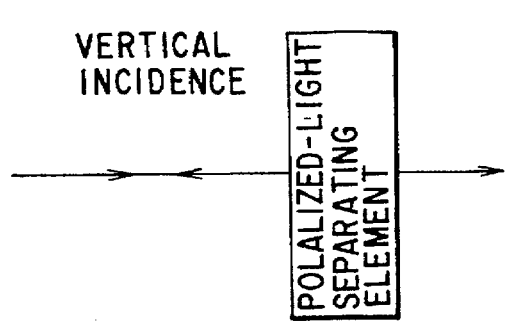
FIGS. 18A and 18B are illustrations showing an incident angle to the polarized light-separating means.
Figure 18B:
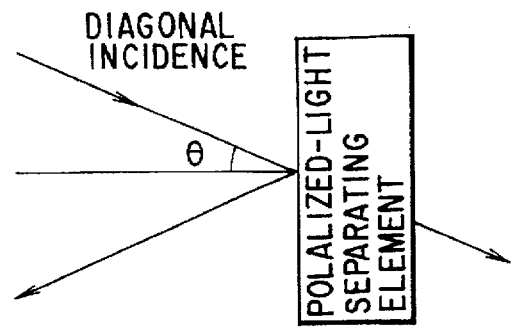

The interference wavelength area of the cholesteric liquid-crystal is different between the case shown in FIG. 18A, in which light perpendicularly incident, and the case shown in FIG. 18B, in which light is diagonally incident.

Figure 18C:
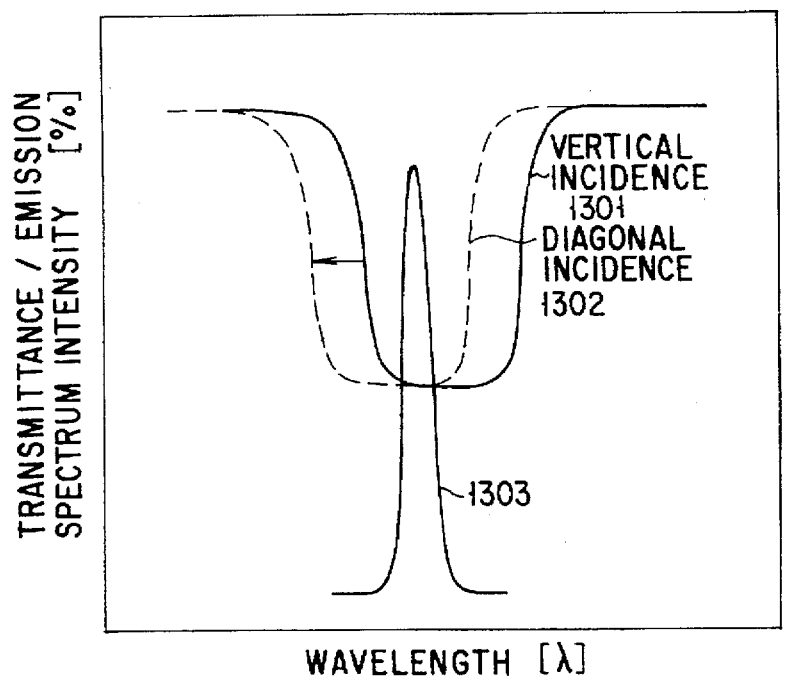
FIG. 18C is a diagram showing changes in optical characteristics of the light separating element depending on the incident angle.

To be more specific, as shown in FIG. 18C, compared to the interference wavelength area 1301 obtained in the case where light is perpendicularly made incident, the interference wavelength area 1302 obtained in the case where light is made incident diagonally, shifts to the shorter wavelength side. Therefore, the interference wavelength area should be extended to the longer wavelength side in such a way that the emission spectrum 1303 is included in the interference wavelength area 1302 given by the diagonal incident.

Alternatively, the difference 1207 between the end of the shorter wavelength side of interference wavelength area and the peak wavelength 1201 of the emission spectrum of a light source may be larger than the difference 1208 between the end of longer wavelength side of the interference wavelength area and the peak 1202.

Figure 19A:
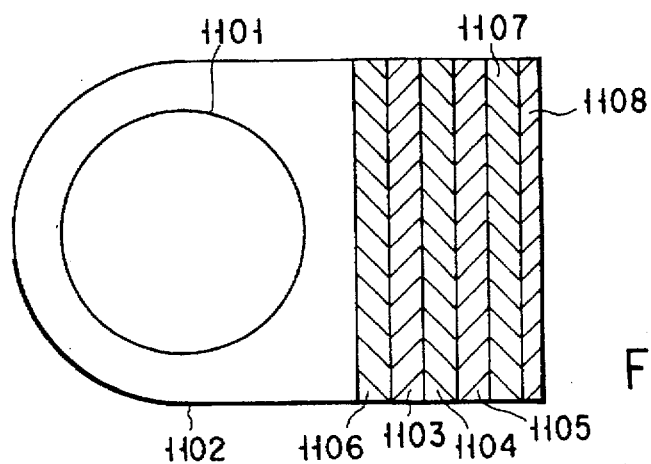
FIG. 19A is a view showing a modified Embodiment 12 shown in FIG. 16.
Figure 19B:
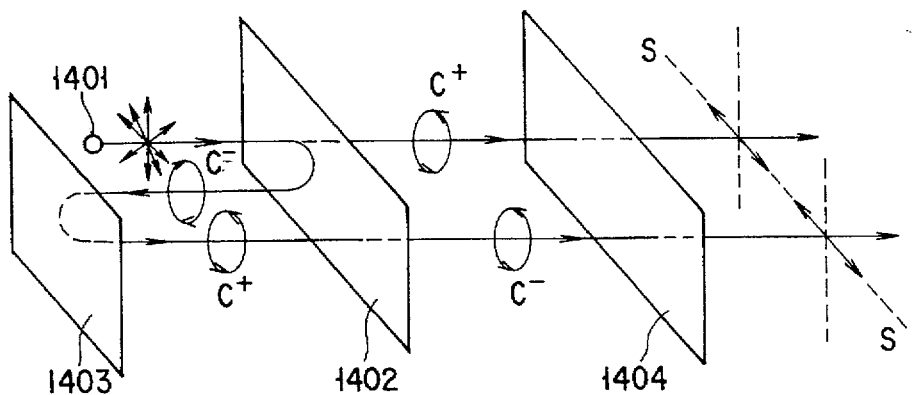
FIG. 19B is an illustration showing the relationship between the polarized light and the optical system of the illumination device shown in FIG. 19A.

FIG. 19A is a modified embodiment of the illumination device shown in FIG. 16, in which a light converting element is placed on the side opposite to a light source of the light separating element. In this illumination, device a quarter-wave film 1108 made of PVA is used as a light converting element. The PVA film is adhered on one of the glass substrates sandwiching cholesteric liquid-crystal sheets, placed on the side opposite to the light source. Thus, linearly-polarized light is produced when the light converting element is disposed on the rear side of the light separating element. The direction of adhering the light converting element may be adjusted depending on the direction of desired linearly-polarized light. FIG. 19B shows the relationship between the optical system of the illumination device and the polarized light.

The non-polarized light (N) emitted from a light source 1401 is made incident on a light separating element 1402. Thereafter, the non-polarized light (N) is separated into two circularly-polarized light components, namely a light component (C+) having a clockwise polarity and a light component (C−) having a counterclockwise polarity, viewed from the transmission side, in other words, viewed in a reverse direction of light proceeding. In this case, the clockwise circularly-polarized light component is defined as a first circularly polarized light component and the counterclockwise circularly-polarized light component as a second circularly polarized light component. However, the same definition can be applied to the opposite case.

The second circularly-polarized light component (C−) is reflected and returned to the light source side. The polarity of returned circularly-polarized light beam (C−) is reversed by a polarized light converting element 1403 such as the surface of the light source, a reflector, a glass interface, or a mirror. As a result, the light (C−) is converted into a circularly polarized light component (C+) which can be transmitted through the light separating element. The circularly-polarized light component having the same planes of vibration is transmitted through a light converting element 1404 to be converted into a linearly-polarized light component (S).

Figure 20:
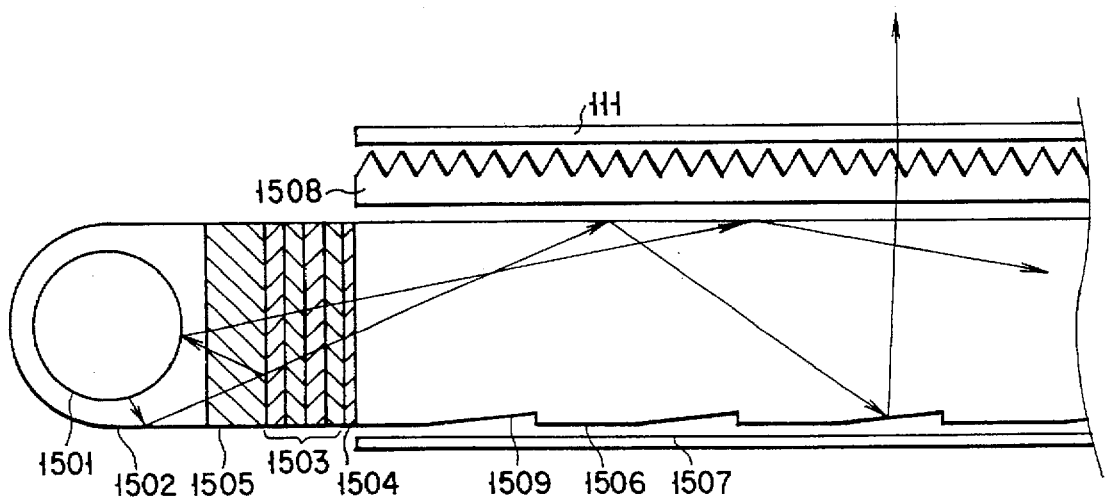
FIG. 20 is a schematic view showing an example of the illumination device comprising a light converting means, a phase-difference converting means, and a second light-guiding member provided on the rear portion of the phase converting means.

FIG. 20 is a schematic view showing an example of the illumination device comprising a light converting element and a second light-guiding member which is provided on the rear side of the light converting element.

The linearly-polarized light is emitted on a light-guiding plate 1506 side via a light separating element 1503 consisting of a light source 1501, a reflector 1502, cholesteric liquid-crystal sheets, and light converting element 1504 consisting of PVA quarter-wave film. Furthermore, auxiliary light-guiding plate 1505, serving as part of a first light-guiding member, is disposed between the light source and the light separating element.

The second light-guiding member mainly consists of PMMA light-guiding plate 1506, mirror-face reflection sheet 1507 formed by aluminium deposition, and a prism sheet 1508. The linearly-polarized light made incident from the end face of the light-guiding plate 1506 travels while being totally-reflected on the interface of the light-guiding plate. In this case, the light converting element 1504 is disposed in such a way that the vibration surface of the linearly-polarized light is made incident on the reflection face as an S polarized light. Therefore, the rotation of the vibration surface of the linearly polarized light and cancellation of the polarized light do not occur in the light-guiding plate 1506. The birefringence of the light-guiding plate 1506 is small enough to ignore, so that the polarization state of the light is preserved without canceling out polarization while the light is traveling through the light-guiding plate 1506.

The light-guiding plate 1506 has V-shape grooves on the surface of which an aluminium reflection film is provided. When the light is reflected by the aluminum reflection film, the reflection angle is changed, so that the light is outside the total reflection conditions. Consequently, the light is emitted from the light-guiding plate 1506. The V-shape grooves 1509 are formed so as to satisfy the conditions in which the vibration face of the linearly-polarized light as a S polarized light beam is made incident on the reflection face. Therefore, the polarized light beam can maintain its polarity. From the foregoing, it is clear that the light emitted from the light source can be emitted from the upper surface of the light-guiding plate as linearly-polarized light having the same vibration-face, with no substantial loss in its amount.

A prism sheet 1508 may be placed to improve brightness by collecting the light beams emitted from the light-guiding plate 1506. The prism sheet 1508 can be used singly or 2 prism sheets 1508 may be used.

To distribute the brightness uniformly, the V-shape grooves of the light-guiding plate 1506 may be provided sparsely on the side close to the light source, and densely on the side far from the light source. The same effect can be obtained if the light is allowed to emit on the lower side of the light-guiding plate, once, and then reflected by the mirror-face reflection sheet 1507, instead of providing aluminium reflection films on the V-shape grooves 1509. The same effect can be further obtained by providing V-shape projections instead of the V-shape grooves 1509 to change a reflection angle.

Figure 21:
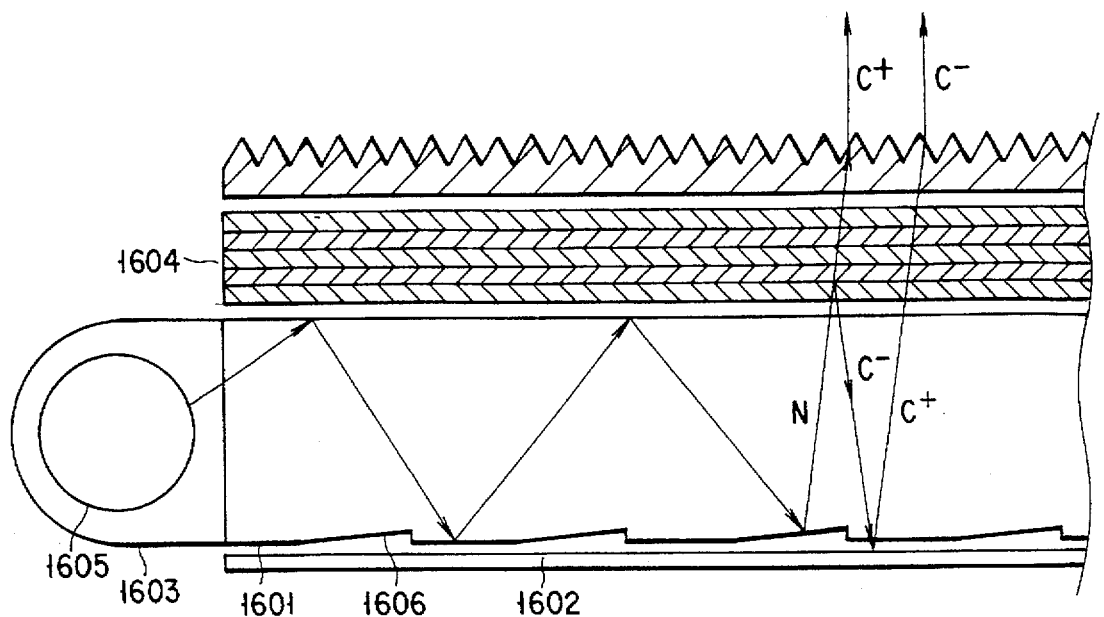
FIG. 21 is a view showing an example of the illumination device characterized by comprising a light-guiding plate interposed between a light source and a light converting means.

FIG. 21 is a view showing an example of the illumination device characterized in that a light-guiding plate is disposed between the light source and the light converting element. In this structure, a first light-guiding member or a light converting element can be a light-guiding plate 1601, a mirror-face reflection sheet 1602, together with, for example, a reflector 1603. The first light-guiding member thus-constituted herein corresponds to a second light-guiding member in the illumination device shown in FIG. 20. In the illumination device shown in FIG. 21, a light separating element 1604 formed of cholesteric liquid-crystal sheets is provided over the entire surface of the upper main face of the light-guiding plate 1601. The structure of the light-guiding plate 1601 is the same as that of the embodiment shown in FIG. 16.

The non-polarized light (N) emitted from a light source 1605 is made incident on the light-guiding plate 1601 from the end surface thereof, directly or after being reflected by a reflector 1603. The incident light travels through the light-guiding plate 1601 while repeating total reflection. This light is reflected by the reflection face of the V-shape grooves 1606 formed in the light-guiding plate 1601 or on the lower side of the light-guiding plate 1601, and then emitted from the light-guiding plate 1601 and finally made incident on the light separating element 1604.

The non-polarized light emitted from the light source and made incident on the light separating element 1604 is separated into a first circularly-polarized light component and a second circularly-polarized light component. The first circularly-polarized light component is transmitted through the light separating element 1604 and emitted on the side opposite to the light-guiding plate. The second circularly-polarized light component (C−) is reflected and emitted on the side of light-guiding plate 1601, transmitted through the light-guiding plate 1601, and further reflected by the mirror-face reflection sheet 1602 formed by aluminium deposition. At this time, the second circularly-polarized light component is converted into a first circularly-polarized light component to be a transmissible light through a light separating element. Hence, almost all light components emitted from the light source are emitted from the light separating element 1604 as a first circularly-polarized light component.

If a light converting element such as a quarter-wave film is provided on the rear side, the circularly-polarized light can be converted into a linearly-polarized light in the same way mentioned above.

To the front and/or rear portions of the light separating element 1604, for example, frosted glass, holographic optical element, prism sheet, auxiliary light-guiding plate, micro-lens, holographic lens eye, AR coat film or the like may be provided as part of the first or second light-guiding member.

Figure 22:
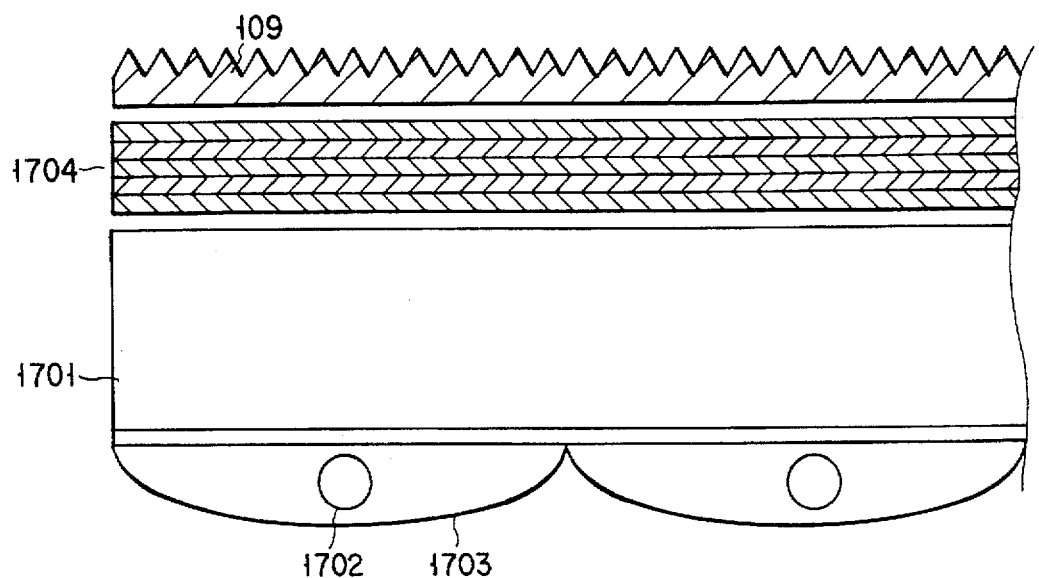
FIG. 22 is a view showing a modified example of the illumination device shown in FIG. 21.

FIG. 22 is a modified embodiment of the illumination device shown in FIG. 21, which is formed by applying the present invention to the illumination device of a directly-under type. In the modified embodiment, a light source 1702 and a reflector 1703 are provided in the lower portion of a light-guiding plate 1701. If auxiliary light-guiding plate shown in FIG. 23 is used as the light-guiding plate, light can be efficiently guided to a light separating element 1704 and the polarity of the circularly-polarized light beam can be converted into the opposite polarity.

Figure 23:
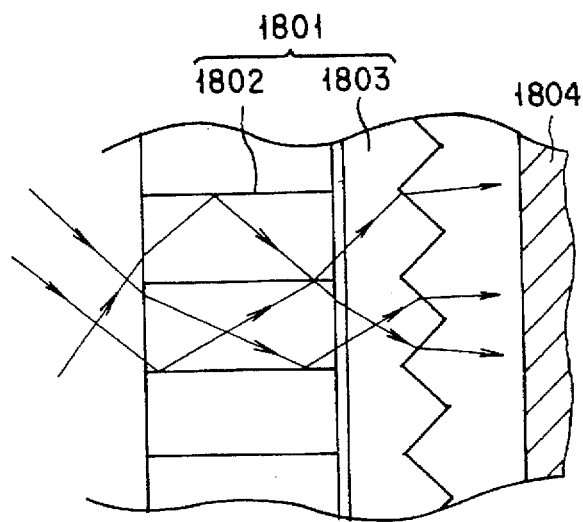
FIG. 23 is a sectional view schematically showing an example of the auxiliary light-guiding plate serving as a light-guiding member or a light separating element.

FIG. 23 is a sectional view schematically showing an example of the auxiliary light-guiding plate serving as a light-guiding member or a light converting element. On an auxiliary light-guiding plate 1801, aluminium-deposited reflection faces 1802 are periodically aligned. Diffused light emitted from the light source side is repeatedly reflected by the reflection faces 1802 and then emitted therefrom. Thereafter, the emitted light is converted into parallel light to each other by a prism-like sheet 1803 and made incident on the light separating element 1804.

Figure 24:
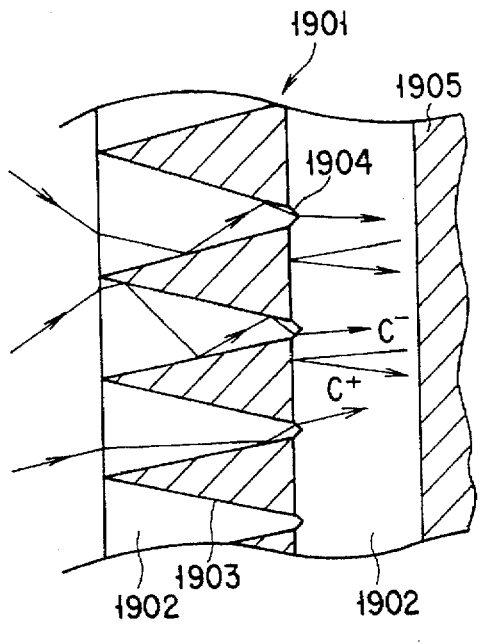
FIG. 24 is a sectional view schematically showing another example of the auxiliary light-guiding plate.

FIG. 24 is a sectional view schematically showing another example of the auxiliary light-guiding plate. The auxiliary light-guiding plate 1901 is formed by the combination of a light-guiding plate 1902 and a mirror face 1903. The light traveling in the auxiliary light-guiding plate is converted into parallel light by projections 1904 and made incident on the light separating element 1905. On the other hand, a second circularly-polarized light component reflected by the light separating element 1905 is further reflected by a mirror face 1903 and converted into a first circularly-polarized light component. By providing the mirror face 1903, light is no longer irregularly reflected and is efficiently guided into the light separating element 1905.

Figure 25:
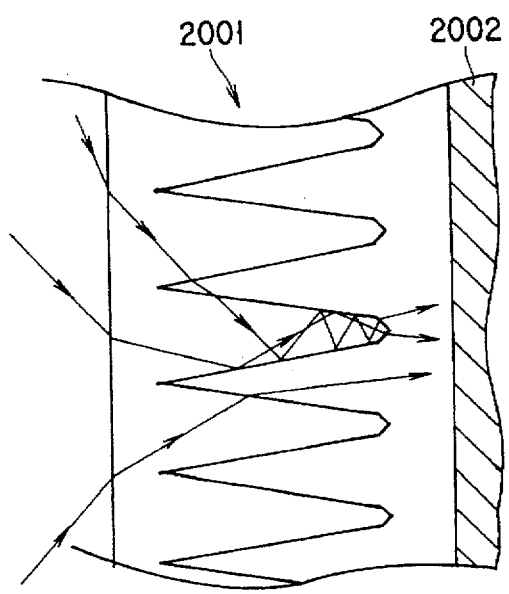
FIG. 25 is a sectional view schematically showing still another example of the auxiliary light-guiding plate.

FIG. 25 is a sectional view schematically showing still another example of the auxiliary light-guiding plate. The auxiliary light-guiding plate 2001 is formed at an angle at which multiple reflection is generated by total reflection. Diffused light beams emitted from the light source are collected by total reflection or refracted at an angle outside of the range of ensuring total reflection. The light beams are finally changed to parallel light beams. In this case, no mirror reflection occurs so that the light emitted from a light source can be guided to a light separating element 2002 without generating a substantial loss in a light amount due to multiple reflection.

Figure 26:
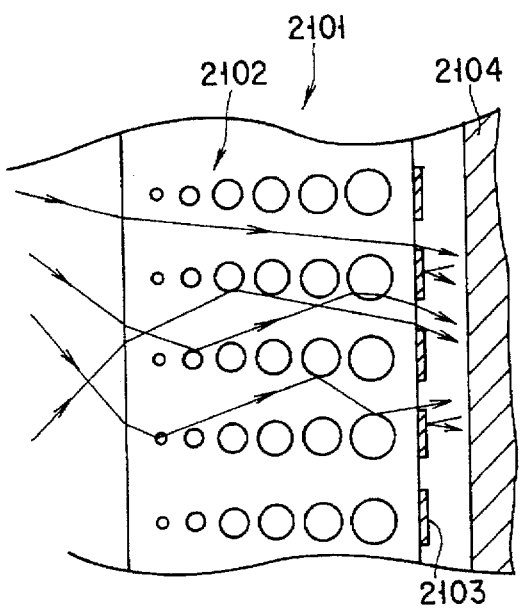
FIG. 26 is a sectional view schematically showing a further example of the auxiliary light-guiding plate.

FIG. 26 is a sectional view schematically showing a further example of the auxiliary light-guiding plate. The auxiliary light-guiding plate 2101 has a plurality of cylinder-shape holes 2102 having different diameters. A reflection face 2103 is formed on the light emitting side. Diffusion light emitted from the light source travel while repeating total reflection or being refracted by the reflection interface of cylinder-shape holes 2102. By optimizing the size and shape of the holes, light can be efficiently made incident on a light separating element 2104 from the portion other than the portions to which the reflection faces 2103 are provided. The light reflected by the light separating element 2104 is further reflected by a mirror surface, such as the reflection face 2103, so that a second circularly-polarized light component can be efficiently converted into a first circularly-polarized light component.

FIG. 27 is a diagram showing the relationship between light incident angle on the light separating element and the degree of polarization. With an increase of the light incident angle, the degree of polarization decreases. In other words, the ability of separating a first circularly-polarized light component from a second circularly-polarized light component decreases. Hence, if light is made incident at a low angle by providing the auxiliary light-guiding plate mentioned above, the light utilization efficiency will be increased which improves the brightness of the illumination device.

FIG. 28 is a diagram showing the ability to separate light in the presence or absence of the auxiliary light-guiding plate.

FIG. 29 is a view schematically showing an example of the illumination device comprising an auxiliary light-guiding plate. To allow the light separating element 2401 to function sufficiently, a light-guiding member or an auxiliary light-guiding plate 2402 serving as a light converting element is provided on the light incident side. In this illumination device, the light converting element 2401 is disposed between the light source 2403 including a reflector 2404 and a light-guiding plate 2405. Further, the auxiliary light-guiding plate is disposed between the light source 2403 and the light separating element 2401.

Figure 30:
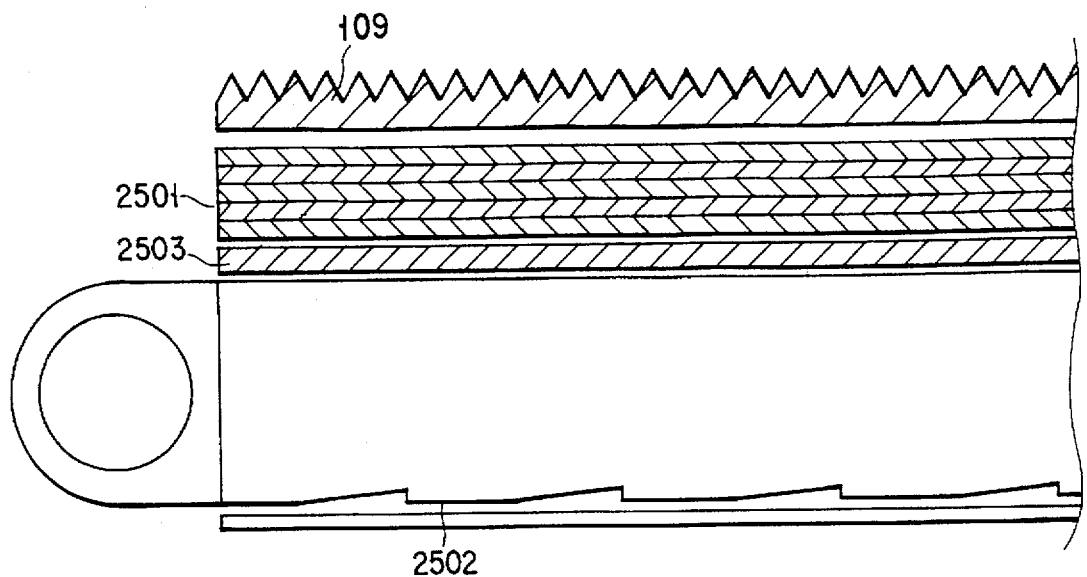
FIG. 30 is a sectional view showing an example of the illumination device comprising an auxiliary light-guiding plate.

FIG. 30 shows an illumination device having a light separating element 2501 provided over the entire surface of the light emitting face of a light-guiding plate 2502. In the illumination device, an auxiliary light-guiding plate 2503 is disposed between a light-guiding plate 2502 and the light separating element 2501.

The illumination device explained in the foregoing can be widely applied to an optical system using a polarized light, such as a polarization microscope, liquid-crystal display device and projection-type display device.

Figure 31:
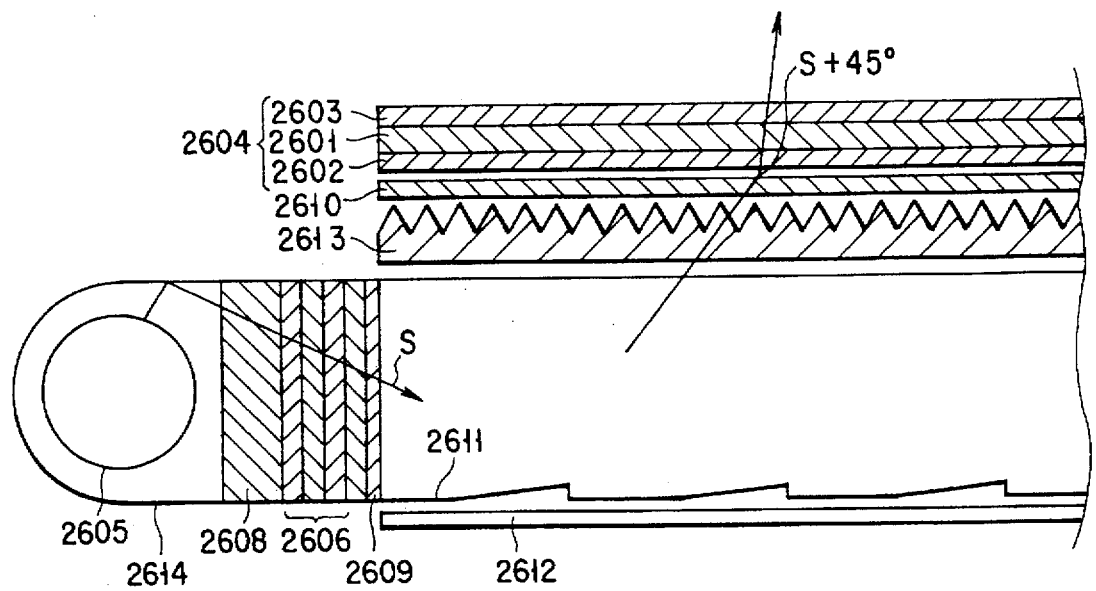
FIG. 31 is a sectional view schematically showing an example of the liquid-crystal display of the present invention.

FIG. 31 is a sectional view schematically showing an example of the liquid-crystal display of the present invention. The liquid-crystal display comprises a liquid-crystal panel 2604 having polarizing plates 2602 and 2603 which are respectively provided on the light incident side and emitting side of the liquid crystal layer 2601, a light source 2605, a plurality of cholesteric liquid-crystal sheet 2606 serving as a light separating element, an auxiliary light-guiding plate 2608, quarter-wave film 2609 serving as light converting element, half-wave film 2610 serving as the light converting element for a linearly-polarized light beam, a light-guiding plate 2611 serving as a second light-guiding member for guiding a transmissible light through a light separating element, a mirror face reflection sheet 2612, and a prism sheet 2613. The liquid-crystal driving mode of the liquid-crystal display is TN, however, the present invention can be applied to the liquid-crystal display using another driving mode.

In the liquid-crystal display, the basic structure of the portion corresponding to an illumination device is the same as that of any one of the illumination devices mentioned above. The light emitted from the light source converted into a first circularly-polarized light component having the same polarity, by a first light-guiding member, a reflector 2614 as a light converting means, an auxiliary light-guiding plate 2608 and cholesteric liquid-crystal sheets 2606.

The first circularly-polarized light component having the same polarity is converted into a linearly-polarized light beam (S) by a quarter-wave film 2609 and then made incident in PMMA light-guiding plate 2611. At this time, the quarter-wave film is disposed in such a manner that the polarization direction of the incident light with respect to the entire reflection face, including upper and lower faces, is S-polarization. Aluminium-deposited mirror-face reflection sheet 2612 is disposed to the lower portion of the lower main surface of the light-guiding plate. On the other hand, a prism sheet 2613 is disposed to the upper portion of the upper main surface.

The half-wave film 2610 serving as a light converting element is interposed between the prism sheet 2613 and a liquid-crystal panel 2604. The light converting element is one designed for making the vibration-face of the linearly-polarized light obtained by the quarter-wave film 2609, which is the light converting element, to coincide with the light transmitting axis of the incident-side polarizing plate of the liquid-crystal. Therefore, the light converting element may be disposed in any position between the quarter-wave film 2609 and the incident-side polarizing plate 2602. Alternatively, a plurality of the light converting element may be disposed.

The linearly-polarized light incident on the light-guiding plate 2611 travels while repeating total reflection on the interface of the light-guiding plate 2611. Since the vibration-face of the linearly-polarized light satisfies the conditions required by S-polarized light incident with respect to the reflection face, the rotation of the vibration-face and cancellation of polarization will not occur. Furthermore, birefringence of the light-guiding plate 2611 is small enough to ignore, the cancellation of polarization does not take place while the light is traveling in the light-guiding plate 2611. Consequently, the polarization state will be preserved.

The light emitted from the light-guiding plate 2611 is made incident on the prism sheet 2613, in which the direction of the emitting light is adjusted and made incident on the half-wave film 2610.

The vibration direction of the linearly-polarized light emitted from the prism sheet 2613 via the light-guiding plate 2611 is perpendicular with respect to the longitudinal direction of the display screen of a liquid-crystal panel 2604. The transmitting axis of the polarizing plate of the liquid-crystal panel 2604 is inclined by 45° with respect to the longitudinal direction of the display screen. A half-wave film 2610 is used to make the vibration direction of the linearly-polarized light coincide with the transmitting axis of the polarizing plate. The polarization direction of the incident light is rotated by 45° (S+45° in FIG. 32) by the half-wave film 2610. As a result, the light is guided into the incident-side polarizing plate 2602 of the liquid-crystal panel. The vibration face of the linearly-polarized light is not always rotated at an angle of 45°, so that the half-wave film may be disposed in such a way that the linearly-polarized light travels along the transmitting axis of the polarizing plate of the liquid-crystal panel.

When incident light is S-polarized light, the prism sheet 2613 may be disposed in the direction obtained by rotating by 90° with respect to the direction shown in FIG. 31. When the incident light is P polarized light, the prism sheet is disposed in the direction shown in FIG. 31.

Alternatively, the prism sheet 2613 may be exchanged with the half-wave film 2610 in the position.

Based on the structure mentioned above, the light beam absorbed by the incident-side polarizing plate of the liquid-crystal panel and not utilized as illumination light in the prior art, can be efficiently used as illumination light without being absorbed and enlarging the device size. Therefore, the liquid-crystal display device having high brightness is successfully realized with little power consumption.

Figure 32:
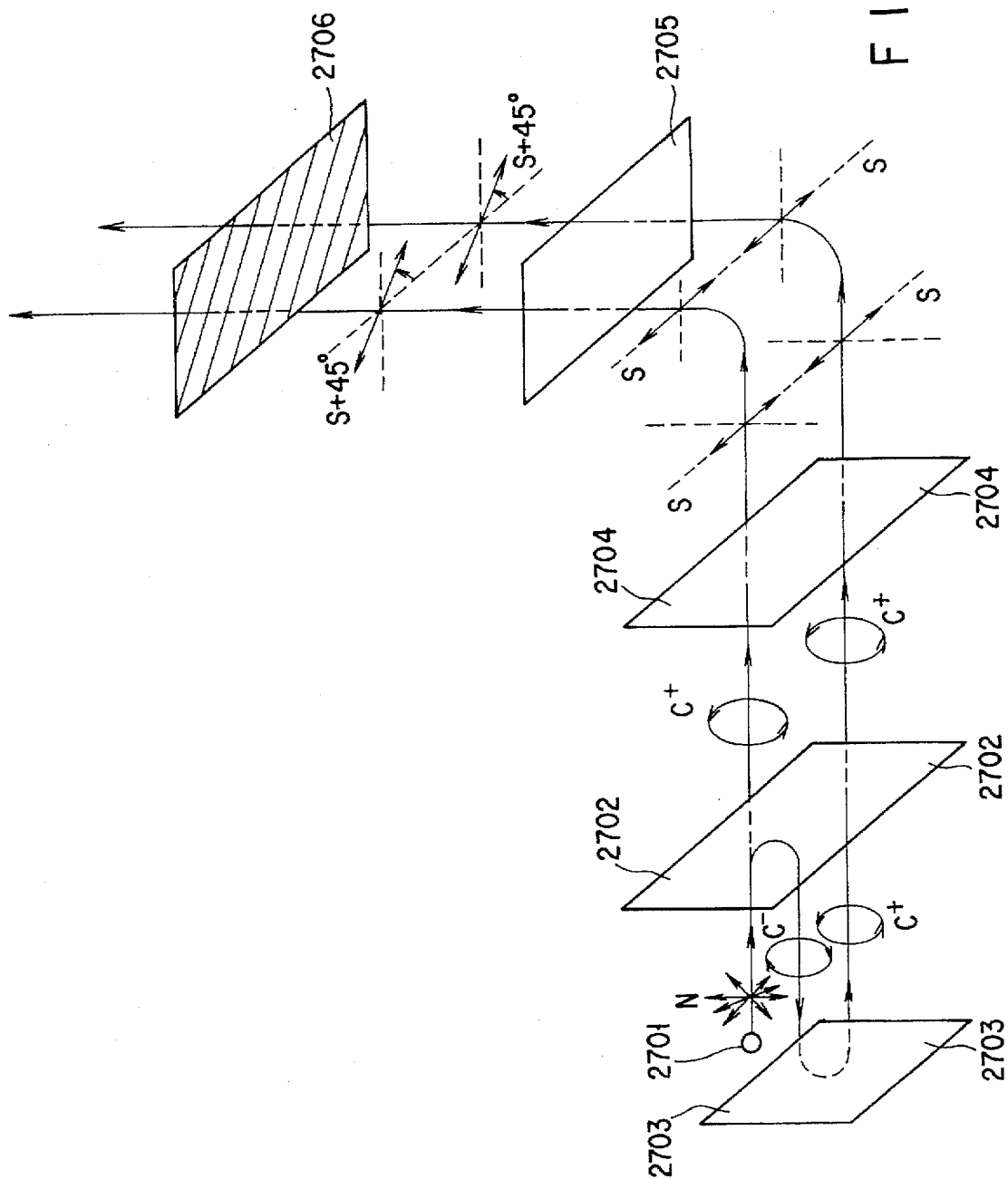
FIG. 32 is an illustration showing the relationship between polarized light and the position of the optical members corresponding to those of the liquid-crystal display shown in FIG. 31.

FIG. 32 shows the relationship between the polarized light and the position of optical members of the optical system corresponding to those of the liquid-crystal display device shown in FIG. 31.

The light separating element 2702 exemplified herein is preferably one capable of transmitting a first circularly-polarized light component and reflecting a second circularly-polarized light component.

Non-polarized light (N) emitted from a light source 2701 is made incident on a light separating element 2702. Thereafter, the non-polarized light (N) is separated into a clockwise circularly-polarized light component (C+) and a counterclockwise circularly-polarized light component (C−) as viewed from the transmitted side, namely, viewed in the reverse direction of light proceeding. In this case, the clockwise circularly-polarized light component is defined as a first circularly-polarized light component and the counter-clockwise circularly-polarized light component as a second circularly-polarized light component. However, the same definition can be applied to the opposite case.

The second circularly-polarized light component (C−) is reflected and returned to the light source side. The returned light (C−) is reversed in its polarity of circularly-polarized light component by the light converting surface 2703, such as the surface of a light source, reflector, glass interface, or mirror, thereby converting the light into transmissible light through the light separating element. As explained in the foregoing, the light converting element 2702 may be used together with a light-guiding member.

Figure 33:
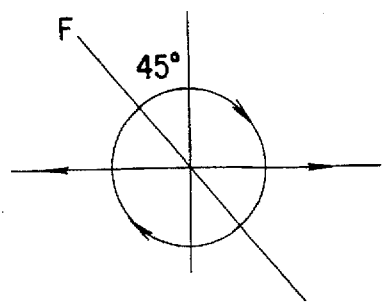
FIGS. 33 to 35 are illustrations conceptually showing the state of the polarized light.

The circularly-polarized light component having the same polarity are converted into linearly-polarized light component (S) while passing through a light converting element 2704. The relationship of the fast axis (F) and the incident circularly-polarized light (C+) and emitting linearly-polarized light (S) at third time is shown in FIG. 33.

Figure 34:
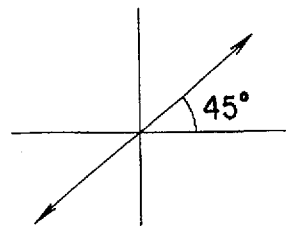
Figure 35:
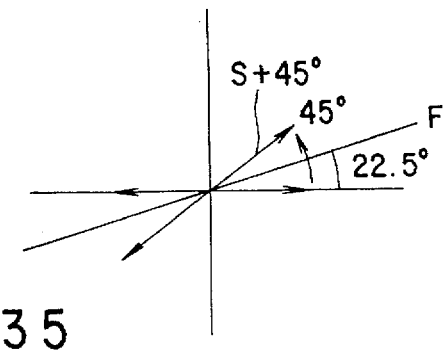

For example, in the liquid-crystal display exemplified in FIG. 31, the emitting direction of the linearly-polarized light is changed by the reflecting face of the light-guiding plate which is a part of a second light-guiding member, while preserving its polarization state and then made incident on the half-wave film 2705. In the case where the transmitting axis (T) of the incident-side polarizing plate 2706 of the liquid-crystal panel is in a position such that the axis (T) is rotated at an angle of 45° with respect to the S-polarized light as shown in FIG. 34, the fast axis of the half-wave film is set to the position which equally divides the angle formed between transmitting axis of the polarizing plate and the linearly-polarized light component (in other words, if the fast axis is set at an angle of 22.5° with respect to the incident direction of the S polarized light, as shown in FIG. 35), the light incident on the vibration converting means will be the transmissible light (S+45°) through the polarizing plate.

All the circularly-polarized light components transmitting through the light separating element 2702 may have the same polarity when they are reflected or transmitted through the element 2702. Alternatively, the clockwise circularly-polarized light component (first circularly polarized light component) may be reflected and the counterclockwise circularly-polarized light component (second circularly-polarized light component) may be transmitted. Furthermore, the linearly-polarized light incident on the light-guiding plate may be P polarized light instead of S polarized light. By controlling the fast axes of the quarter-wave film and half-wave film so as to satisfy these conditions, the vibration direction of light may be designed to be along the transmitting axis of the polarizing plate of the liquid-crystal panel.

Figure 36:
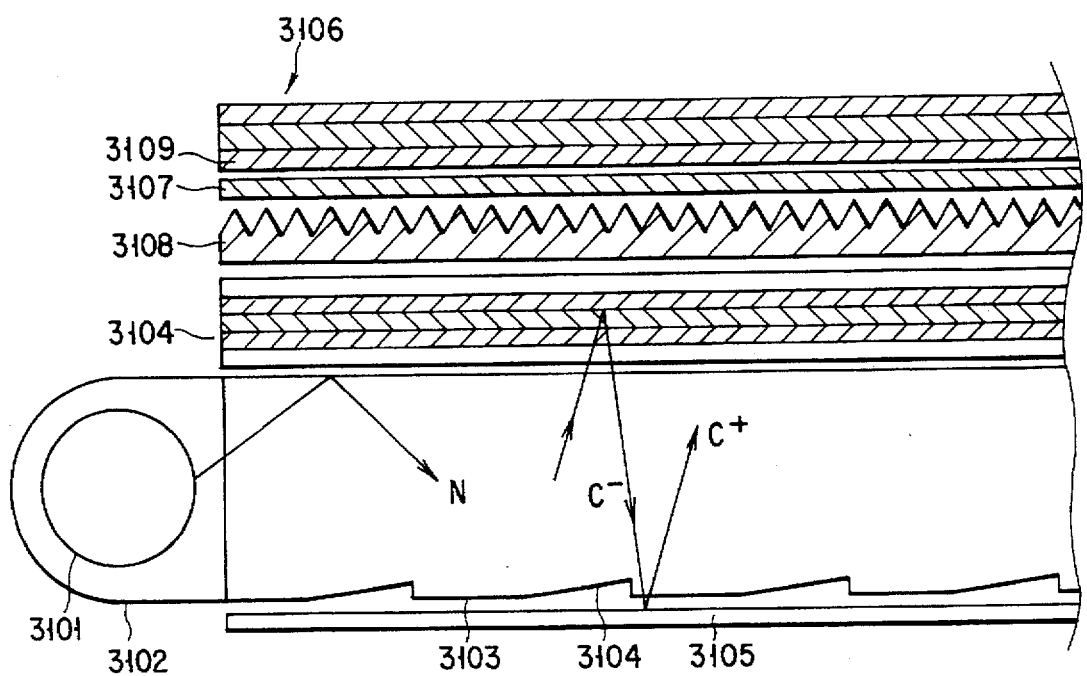
FIG. 36 is a sectional view schematically showing another example of the liquid-crystal display of the present invention.

FIG. 36 is a view showing a structure of another example of the liquid-crystal display of the present invention. In the liquid-crystal display, the light separating element is disposed over the entire main surface of the light-guiding plate. The operating mode for the liquid-crystal is STN, however, the present invention can be applied to liquid-crystal displays using another operating mode.

The non-polarized light (N) emitted from a light source portion, consisting of a cold cathode fluorescent tube 3101 and a reflector 3102, travels in a light-guiding plate while repeating total reflection. When the non-polarized light is reflected by V-shape groove(s) 3104, it is made incident on a light separating element 3104 consisting of transparent-film substrates sandwiching a plurality of cholesteric liquid-crystal sheets.

The non-polarized light emitted from the light source and made incident on the light separating element 3104 is separated into a first circularly-polarized light component and a second circularly-polarized light component, each having a different polarity. The second circularly-polarized light component, denoted as a reflected light component (C−), is transmitted through a light-guiding plate 3103 and reflected by an aluminium-deposited reflecting-face 3105. Since the polarity of the second circularly-polarized light component (C−) is changed to C+ by the reflection, it is finally converted into a transmissible light through the light separating element.

The circularly-polarized light component transmitted through the light separating element is converted into a linearly-polarized light component coincident with the transmitting axis of an incident-side polarizing plate 3109 of the liquid-crystal panel 3106, by a quarter-wave film 3107 serving as a light converting element. Thereafter, the linearly-polarized light is made incident on the incident-side polarizing plate 3107 of the liquid-crystal panel. Hence, the present invention makes it possible to utilize the half of the light emitted from a light source which has not been successfully utilized. Furthermore, by the present invention, it is possible to realize a liquid-crystal display attaining high brightness and a high light-utilization efficiency with little power consumption.

In the display shown in FIG. 36, the transmissible light beams through the light separating element may be collected by a prism sheet 3108 and then made incident on the incident-side polarizing plate 3109 of the liquid-crystal panel 3106. A plurality of the prism sheets 3108 may be used. Furthermore, the prism sheet 3108 may be disposed in the previous portion of the light separating element 3104. In this case, the prism sheet is substantially a part of a first light-guiding member.

Figure 37:
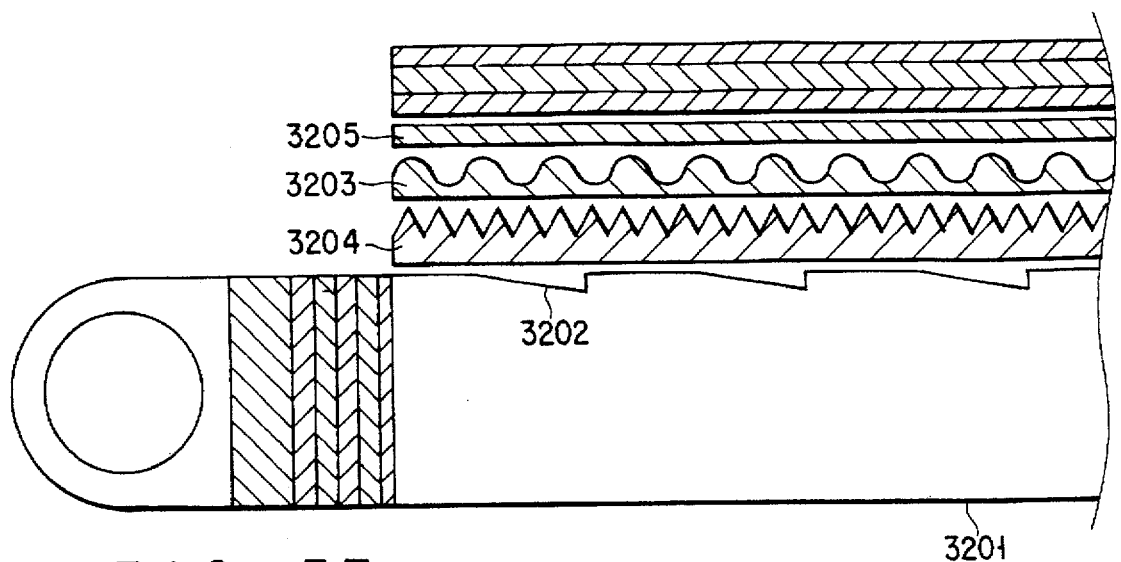
FIG. 37 is a sectional view schematically showing still another example of the liquid-crystal display of the present invention.

FIG. 37 is a sectional view schematically showing a structure of another example of the liquid-crystal display of the present invention. The liquid-crystal display has the same structure as that of the liquid-crystal display shown in FIG. 31 except that V-shape grooves 3202 are disposed on the upper surface side instead of being disposed on the lower portion of the light-guiding plate 3201. The V-shape grooves 3202 may be replaced by V-shape projections.

Figure 38:
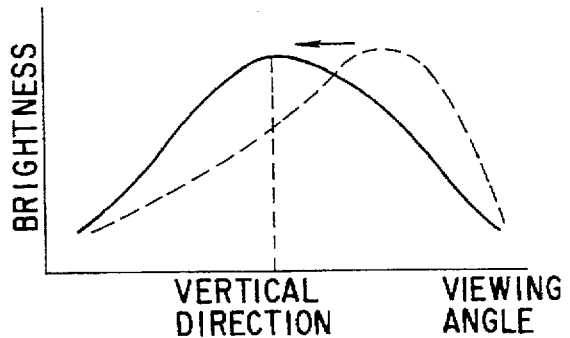
FIG. 38 is a graph showing the relationship between the viewing angle and the brightness of emitting light.

In this structure, a metal reflection sheet is no longer required. The light, which reflects outside the total reflection range and emitted from a light-guiding plate 3201, does not suffer a loss due to metal reflection. Hence, the light can be reflected with a high efficiency. However, since most of the light components emitted from the light-guiding plate 3201 travel diagonally, the direction of maximum brightness is outside the perpendicular direction of the screen as shown in FIG. 38. Then, as shown in FIG. 38, by adding a holographic optical element (HOE) 3203, the direction of maximum brightness is brought to coincide with the perpendicular direction of the screen while the polarization state is being preserved.

HOE 3203 may be used as a part of a second light-guiding element with the purpose of optimizing the direction of brightness not only in the liquid-crystal display shown in FIG. 37, but also in other liquid-crystal displays or illumination devices. HOE 3202 can be disposed interchangeably with the prism sheet 3204 or the half-wave film 3205.

Figure 39:
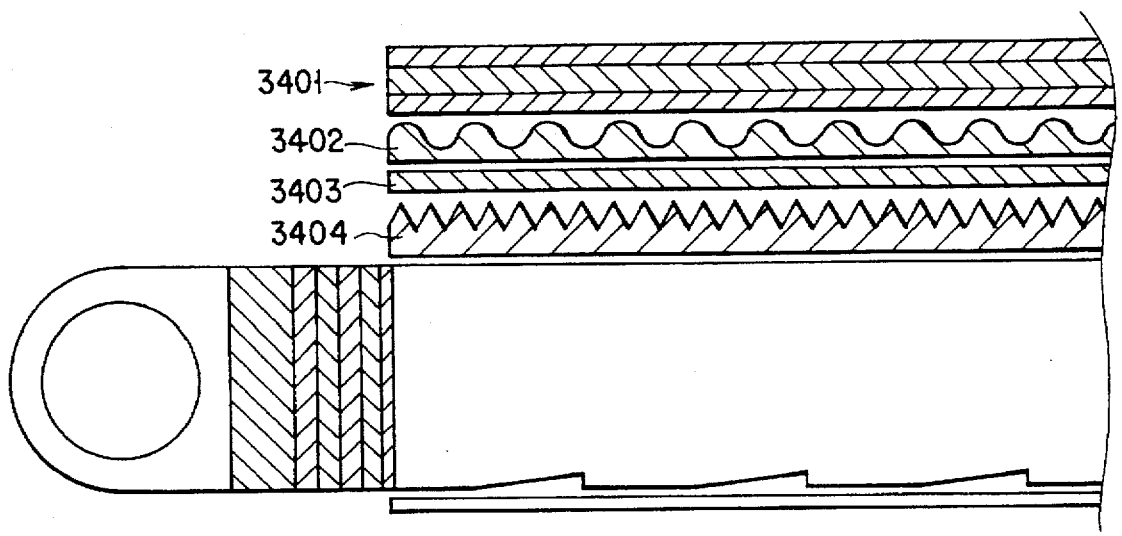
FIG. 39 is a sectional view schematically showing further example of the liquid-crystal display of the present invention.

FIG. 39 is a sectional view schematically showing still another example of the liquid-crystal display of the present invention. In this liquid-crystal display, a diffusion plate is used as a part of a second light-guiding member for the purpose of improving a viewing angle of the liquid-crystal panel 3401. As the diffusion plate, for example, an HOE diffusion plate 3402 may be used.

In the liquid-crystal display, the light emitted from the half-wave film 3403 is diffused by the HOE diffusion plate 3402 and travels in the diagonal direction to the display screen while the polarization state is being preserved. Therefore, when the brightness distribution on the screen display given by the light passing through the liquid-crystal panel 3401 is compared to the brightness obtained by the liquid-crystal display without the HOE diffusion plate 3402, the brightness is more uniformly distributed in the diagonal direction. In this liquid-crystal display, the polarization state of the emitted light can be preserved so that the amount of light absorbed by a polarizing plate of the liquid-crystal panel 3401 can be reduced as compared to the liquid-crystal display employing a generally-used white diffusion plate. Consequently, the brightness over the entire screen can be improved.

The diffusion sheet can be used as a part of a second light-guiding member with the purpose of optimizing the brightness direction not only in the liquid-crystal display show in FIG. 39, but also in other liquid-crystal displays and illumination devices. The prism sheet 3404 may be disposed interchangeably with the half-wave film 3403.

As described in the foregoing, according to the illumination device of the present invention, the light emitted from the light source can be efficiently converted into a circularly-polarized light component having the same polarity. Furthermore, the light emitted from the light source can be efficiently converted into the linearly-polarized light components having the same vibration face.

In the liquid-crystal display of the present invention, the light emitted from a light source is improved in its utilization efficiency, without enlarging the device size, which improves brightness. Furthermore, the power consumption can be reduced.

Additional advantages and modifications will readily occur to those skilled in the art. Therefore, the invention in its broader aspects is not limited to the specific details and representative devices shown and described herein. Accordingly, various modifications may be made without departing from the spirit or scope of the general inventive concept as defined by the appended claims and their equivalents.

What is claimed is:

1. A display device comprising:

an emitter, a direct-view display screen, a light separating element including a cholesteric liquid crystal sheet for selectively separating illumination light emitted from said emitter into a first and second polarized light components and transmitting the first polarized light component and reflecting the second light component, and a reflecting member for converting the reflected second light component to a first light component and returning it to said light separating element.

2. The display device according to claim 1, wherein said emitter is a three band fluorescent tube having three main emission spectra.

3. The display device according to claim 1, further comprising a light converting means interposed between said light separating element and said direct-view display screen.

4. The display device according to claim 3, wherein said light converting means is a quarter-wave film.

5. A display device comprising:

an emitter, a direct-view display screen, a light-guiding member for guiding an illumination light emitted from said emitter to said direct-view display screen, wherein said light-guiding member has a surface having projections and depressions inclined to the incident side, formed on the opposite side to said direct-view display screen of said light-guiding member, with a light incident angle approximately equal to Brewster's angle which is represented by the following formula:

$$\theta_B = \tan^{-1}(n_2/n_1)$$

wherein $n_1$ is a refractive index of the incident side medium and $n_2$ is a refractive index of the emitting side medium;

a light separating element for separating the illumination light selectively into a first and second polarized light components and transmitting the first light component and reflecting the second light component, a conversion/reflection member for converting the reflected second light component to a first light component and returning it to said light separating element, and a light converting means for converting a vibration direction of said first light component transmitted through said light separating element into another vibration direction, thereby obtaining the illumination light.

6. A display device comprising:

an emitter, a liquid crystal panel, a light separating element including a cholesteric liquid crystal sheet for selectively separating illumination light emitted from said emitter into a first and second polarized light components and transmitting the first polarized light component and reflecting the second light component, and a reflecting member for converting the reflected second light component to a first light component and returning it to said light separating element.

7. The display device according to claim 6, wherein said emitter is a three band fluorescent tube having three main emission spectra.

8. The display device according to claim 6, further comprising a light converting means interposed between said light separating element and said liquid crystal panel.

9. A display device comprising:

an emitter, a liquid crystal panel, a light separating element including a cholesteric liquid crystal sheet for selectively separating illumination light emitted from said emitter into a first and second polarized light components and transmitting the first polarized light component and reflecting the second light component, a quarter-wave film interposed between said light separating element and said liquid crystal panel, and a reflecting member for converting the reflected second light component to a first light component and returning it to said light separating element.

* * * * *